US008566408B2

(12) United States Patent
Shah et al.

(10) Patent No.: US 8,566,408 B2
(45) Date of Patent: Oct. 22, 2013

(54) METHOD AND SYSTEM FOR PROVIDING A STATEFUL EXPERIENCE WHILE ACCESSING CONTENT USING A GLOBAL TEXTSITE PLATFORM

(75) Inventors: Manish R. Shah, Mountain View, CA (US); Clinton Nielsen, Saint Albert (CA); Manish Maheshwari, Mountain View, CA (US); Scott D. Cook, Woodside, CA (US)

(73) Assignee: Intuit Inc., Mountain View, CA (US)

( * ) Notice: Subject to any disclaimer, the term of this patent is extended or adjusted under 35 U.S.C. 154(b) by 544 days.

(21) Appl. No.: 12/904,966

(22) Filed: Oct. 14, 2010

(65) Prior Publication Data
US 2012/0042021 A1 Feb. 16, 2012

(30) Foreign Application Priority Data
Aug. 13, 2010 (IN) ..................................... 910/KOL/

(51) Int. Cl.
*G06F 15/16* (2006.01)
(52) U.S. Cl.
USPC ............................ 709/206; 709/203; 455/466
(58) Field of Classification Search
None
See application file for complete search history.

(56) References Cited

U.S. PATENT DOCUMENTS

| | | | |
|---|---|---|---|
| 2006/0031771 A1* | 2/2006 | MacHeffner | 715/749 |
| 2007/0293247 A1 | 12/2007 | Bhat et al. | |
| 2008/0172373 A1 | 7/2008 | Jenson et al. | |
| 2008/0220748 A1 | 9/2008 | Park | |
| 2008/0294630 A1* | 11/2008 | Yan et al. | 707/5 |
| 2009/0222341 A1* | 9/2009 | Belwadi et al. | 705/14 |
| 2009/0327953 A1 | 12/2009 | Honkala et al. | |
| 2010/0048229 A1* | 2/2010 | Rizzi | 455/466 |
| 2010/0062745 A1* | 3/2010 | Silk | 455/411 |
| 2011/0010352 A1* | 1/2011 | Jockisch et al. | 707/706 |
| 2011/0276642 A1* | 11/2011 | Gioev et al. | 709/206 |
| 2012/0329489 A1* | 12/2012 | McGary | 455/466 |

OTHER PUBLICATIONS

PCT Notification of Transmittal of the International Search Report and the Written Opinion of The International Searching Authority, or The Declaration issued in International Application No. PCT/US2010/052848 mailed on Aug. 23, 2011, 7 pages.
4INFO SMS Mobile Media, "Publishing and Mobile Marketing", http://advertising.4info.com/publishers, Dec. 4, 2009, 2 pages.

* cited by examiner

*Primary Examiner* — Hadi Armouche
*Assistant Examiner* — Christopher C Harris
(74) *Attorney, Agent, or Firm* — Osha Liang LLP

(57) ABSTRACT

A method for providing access to content using a global textsite platform (GTP), including receiving, from a user device associated with a device identifier, a first user message including a first navigation state identifier of a sequential plurality of navigation state identifiers, identifying a first text page of the textsite associated with the first navigation state identifier, and identifying a second text page associated with a first navigating keyword, where the second text page is navigable from the first text page. The method also includes determining a second navigation state identifier sequentially after the first navigation state identifier, associating the second text page with the second navigation state identifier, and storing the association. The method also includes generating a GTP message of the first text page, including the first navigating keyword modified by the second navigation state identifier, and sending the GTP message for display on the user device.

28 Claims, 16 Drawing Sheets

METHOD AND SYSTEM FOR PROVIDING A STATEFUL EXPERIENCE WHILE ACCESSING CONTENT USING A GLOBAL TEXTSITE PLATFORM

CROSS REFERENCE TO RELATED APPLICATIONS

This application is related to co-pending U.S. patent application Ser. No. 12/728,165, filed on Mar. 19, 2010, and entitled "METHOD AND SYSTEM FOR MAINTAINING TEXTSITES ON A GLOBAL TEXTSITE PLATFORM," which is also assigned to the assignee of the present application, the subject matter of which is incorporated by reference herein. This application is also related to co-pending U.S. patent application Ser. No. 12/728,169, filed on Mar. 19, 2010 and entitled "ACCESSING TEXTSITES USING TEXT MESSAGING SERVICE," which is also assigned to the assignee of the present application, the subject matter of which is incorporated by reference herein.

This application is also related to co-pending Indian Patent Application No. 491/KOL/2010, filed on Apr. 30, 2010, and entitled "METHOD AND SYSTEM FOR MAINTAINING TEXTSITES ON A GLOBAL TEXTSITE PLATFORM," which is also assigned to the assignee of the present application, the subject matter of which is incorporated by reference herein. This application is also related to co-pending Indian Patent Application No. 490/KOL/2010, filed on Apr. 30, 2010 and entitled "ACCESSING TEXTSITES USING TEXT MESSAGING SERVICE," which is also assigned to the assignee of the present application, the subject matter of which is incorporated by reference herein.

This application claims priority under 35 U.S.C. §119(e) to Indian Patent Application No. 910/KOL/2010, filed on Aug. 13, 2010, and entitled "METHOD AND SYSTEM FOR PROVIDING A STATEFUL EXPERIENCE WHILE ACCESSING CONTENT USING A GLOBAL TEXTSITE PLATFORM," in the names of Manish Shah, Clinton Nielsen, Manish Maheshwari, and Scott D. Cook.

BACKGROUND

Today's mobile devices, such as smart phones, allow users to browse the Internet from any location to obtain information on demand. As long as a user is in an area with the proper telecommunication network and subscribes to a data plan, the user is provided with access to the Internet for web browsing to obtain information such as phone numbers for service provides, map out a particular destination location, and obtain information relevant to the user's current or next activity. However, there are often instances in which a user wishes to access only limited information for a quick answer to a question (e.g., what are the next available show times for a particular movie?). In this scenario, browsing the website for the movie theater or a service provider website that provides movie show times, such as Fandango, may be cumbersome on the mobile device. Specifically, loading all the graphics and advertisements associated with websites on a mobile device can take additional time. Alternatively, the entire website may provide too much data to navigate through when a user desires only a specific piece of information. In addition, for mobile device users who do not subscribe to a data plan for browsing the Internet, are in an area where the mobile device cannot connect to the proper telecommunication network, or do not have browsing capability on the mobile device, accessing such information on demand is not possible.

One solution to the aforementioned problem is for content publishers to provide information to users on mobile devices via text messaging, in particular those transmitted using Short Messaging Service (SMS). Due to the growth and penetration of SMS capable mobile devices, the content publishers and service providers have attempted to enable access to its content and products via SMS. To facilitate providing content via SMS, each content publisher and/or service provider is required to secure its own SMS codes per country or per geographic region. For example, Google™ has reserved code 466453 for the United States and code 9773300000 for India. Similarly, Facebook® has reserved code 32665 for the United States and code 9232232665 for India (Facebook® is a registered trademark of Facebook Inc., located in Palo Alto, Calif.). Once a local mobile code is provisioned by a local operator of that particular geographic region, a custom adapter is required to be developed to integrate with local operator APIs for sending and receiving SMS. Accordingly, the publisher must create such an adapter. The need for such an adapter often makes offering a company's content via SMS from multiple countries to mobile device users a barrier for a typical web content publisher or web-based service provider.

SUMMARY

In general, in one aspect, the invention relates to a method for providing access to content using a global textsite platform (GTP), including receiving, from a user device, a first user message including a first navigation state identifier of a sequential plurality of navigation state identifiers, where the user device is associated with a device identifier. The method also includes identifying, in a data structure, a first text page of the first textsite associated with the first navigation state identifier, where the data structure is associated with the device identifier. The method also includes identifying a second text page of the first textsite associated with a first navigating keyword, where the second text page is navigable from the first text page. The method also includes determining a second navigation state identifier, where the second navigation state identifier is sequentially after the first navigation state identifier. The method also includes associating the second text page with the second navigation state identifier, and storing the association between the second text page and the second navigation state identifier in the data structure. The method also includes generating a first GTP message of the first text page, where the first text page includes the first navigating keyword modified by the second navigation state identifier, and sending the first GTP message for display on the user device.

In general, in one aspect, the invention relates to a computer readable storage medium including computer readable code that, when executed by a processor, is configured to perform a method for providing access to content using a global textsite platform (GTP). The method includes receiving, from a user device, a first user message including a first navigation state identifier of a sequential plurality of navigation state identifiers, where the user device is associated with a device identifier. The method also includes identifying, in a data structure, a first text page of the first textsite associated with the first navigation state identifier, where the data structure is associated with the device identifier. The method also includes identifying a second text page of the first textsite associated with a first navigating keyword, where the second text page is navigable from the first text page. The method also includes determining a second navigation state identifier, where the second navigation state identifier is sequentially after the first navigation state identifier. The method also includes associating the second text page with the second navigation state identifier, and storing the association between the second text page and the second navigation state identifier in the data structure. The method also includes generating a first GTP message of the first text page, where the first text page includes the first navigating keyword modified by the second navigation state identifier, and sending the first GTP message for display on the user device.

In general, in one aspect, the invention is related to a system for providing access to content using a global textsite platform (GTP). The system includes a data repository including a data structure, where the data structure includes a sequential plurality of navigation state identifiers, and wherein the data structure is associated with a device identifier. The system also includes a processor. The system also includes a memory storing instructions which, when executed by the processor, are configured to receive, from a user device, a first user message including a first navigation state identifier of a sequential plurality of navigation state identifiers, where the user device is associated with the device identifier. The instructions are also configured to identify, in the data structure, a first text page of the first textsite associated with the first navigation state identifier, and identify a second text page of the first textsite associated with the first navigating keyword, where the second text page is navigable from the first text page. The instructions are also configured to determine a second navigation state identifier, where the second navigation state identifier is sequentially after the first navigation state identifier. The instructions are also configured to associate the second text page with the second navigation state identifier, and store the association between the second text page and the second navigation state identifier in the data structure. The instructions are also configured to generate a first GTP message of the first text page, where the first text page includes the first navigating keyword modified by the second navigation state identifier, and send the first GTP message for display to the user device.

In general, in one aspect, the invention relates to a method for providing access to content using a global textsite platform (GTP). The method includes sending, from a user device associated with a device identifier, a first user message including a registered unique keyword maintained by the GTP for a first textsite, where the first textsite includes a home text page for the first textsite, a first text page, and a second text page, where the first text page is indexed by a first navigating keyword, and the second text page is indexed by a second navigating keyword, and where the first text page is navigable from the home text page, and the second text page is navigable from the first text page. The method also includes receiving, in response to the first user message, a first GTP message including the home text page for the first textsite, including the first navigating keyword modified by a first navigation state identifier of a sequential plurality of navigation state identifiers. The method also includes sending, from the user device, a second user message including the first navigation state identifier. The method also includes receiving, in response to the second user message, a second GTP message comprising the first text page including the second navigating keyword modified by a second navigation state identifier that is sequentially after the first navigation state identifier. The method also includes sending, in response to the second GTP message, a third user message including a third navigation state identifier that is sequentially before the first navigation state identifier. The method also includes receiving, from the GTP, a third GTP message of a third text page of a previously visited textsite corresponding to the third navigation state identifier.

In general, in one aspect, the invention relates to a computer readable storage medium comprising computer readable code that, when executed by a processor, is configured to perform a method. The method includes sending, from a user device associated with a device identifier, a first user message including a registered unique keyword maintained by the global textsite platform (GTP) for a first textsite, where the first textsite includes a home text page for the first textsite, a first text page, and a second text page, where the first text page is indexed by a first navigating keyword, and the second text page is indexed by a second navigating keyword, and where the first text page is navigable from the home text page, and the second text page is navigable from the first text page. The method also includes receiving, in response to the first user message, a first GTP message including the home text page for the first textsite, including the first navigating keyword modified by a first navigation state identifier of a sequential plurality of navigation state identifiers. The method also includes sending, from the user device, a second user message including the first navigation state identifier. The method also includes receiving, in response to the second user message, a second GTP message comprising the first text page including the second navigating keyword modified by a second navigation state identifier that is sequentially after the first navigation state identifier. The method also includes sending, in response to the second GTP message, a third user message including a third navigation state identifier that is sequentially before the first navigation state identifier. The method also includes receiving, from the GTP, a third GTP message of a third text page of a previously visited textsite corresponding to the third navigation state identifier.

Other aspects of the invention will be apparent from the following description and the appended claims.

DETAILED DESCRIPTION

Figure 1:
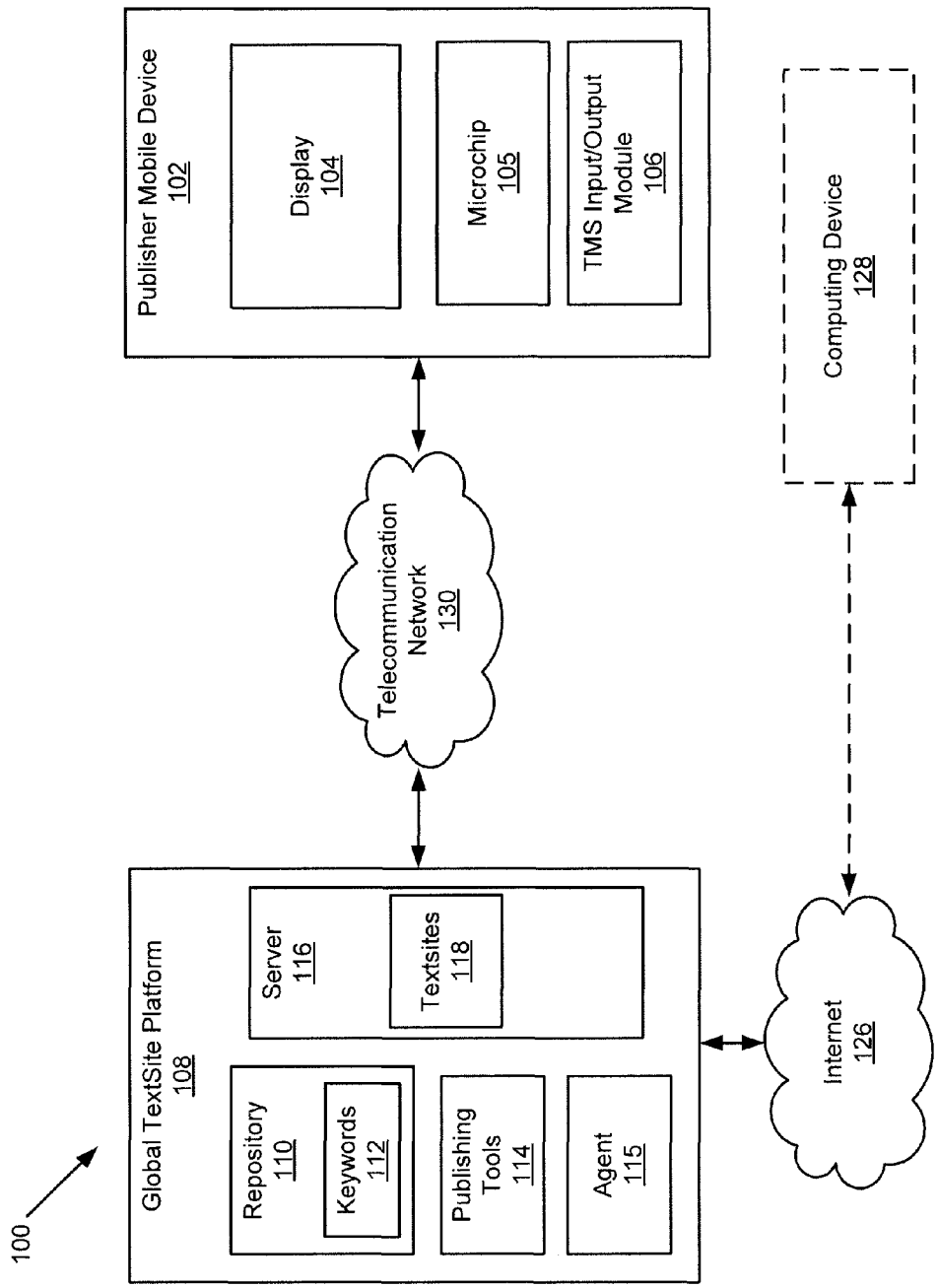
FIG. 1 shoes a flow diagram of a system from the perspective of a publisher in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for providing a stateful experience for users of SMS. Those skilled in the art will appreciate that while text messaging is traditionally a stateless protocol, i.e., there is no mechanism to store, for example, the most recently browsed text page using a text message service, embodiments of the invention provide such a state for text message browsing. More specifically, embodiments of the invention are directed to identifying navigating keywords in a textsite that are associated with text pages, and storing an association between the text pages and navigation state identifiers in a User-Navigation mapping that is specific to a user's mobile device, such that the user may later access and continue browsing one of the text pages using the navigation state identifiers.

While browsing, a user using a mobile device to communicate via a TMS may read a previously received text message stored in the user's text message inbox that is not part of the most recently visited textsite. The use of navigation state identifiers provides a method to track different states of the user's navigation via text message such that multiple textsites may be navigated simultaneously without losing the text page that was last visited (i.e. the state) for each textsite. According to one or more embodiments of the invention, the textsite and text pages are published content. According to one or more embodiments of the invention, the textsite that is re-navigated to may be static or dynamic.

FIG. 1 shows a flow diagram of a system (100) for publishing content by a publisher in accordance with one or more embodiments of the invention. Specifically, FIG. 1 shows a publisher mobile device (102), a telecommunication network (130), and a global textsite platform (108). Each of the aforementioned components of the publisher system is described below.

Generally, a publisher may be any person or entity that wishes for users to have access to information/content via a text messaging service. More specifically, a publisher may be any developer or service provider that provides a service or a product for users. For example, a publisher may be a restaurant owner that creates a textsite to provide information about his/her restaurant. A publisher may possess, in one or more embodiments of the invention, a publisher mobile device (102). In one or more embodiments of the invention, the publisher may optionally possess a computing device (128), such as a desktop computer, a laptop computer, a thin computer, a mobile device associated with a data plan subscription (e.g., a smart phone, a tablet, a pad device, a gaming device a personal digital assistant, etc.), a combination thereof, or any other suitable electronic computing device that is capable of connecting to the global textsite platform (108) via the Internet (126). The computing device (128) may provide greater functionality to interact with the global textsite platform (108) than the publisher mobile device (102). Accordingly, the interaction with the global textsite platform (108) may be accomplished using a network (such as the Internet (126)), rather than a telecommunication network (130). In one or more embodiments of the invention, the computing device (128) includes functionality such as the computing device (1100) shown in FIG. 10 and described below.

The publisher mobile device (102) may be any mobile device, such as a Code Division Multiple Access (CDMA) device, a global system mobile (GSM) device, a 3G device, a 4G device, or any other suitable mobile device that includes text messaging functionality. The publisher mobile device (102) includes a display (104), a microchip (105), and a text messaging service (TMS) input/output module (106). In one or more embodiments of the invention, the publisher mobile device (102) is operatively connected to a global textsite platform (108) via a telecommunication network (130). The telecommunication network (130) may be any network that facilitates the exchange of messages from one part of the network to another. For example, the telecommunication network (130) may be a wide area network, a local area network, a public switched telephone network (PSTN), or any other suitable network for exchanging messages between the global textsite platform (108) and the publisher mobile device (102).

The display (104) of the publisher mobile device (102) may be a display screen using technology such as liquid crystal display (LCD), a light emitting diode (LED), organic light emitting diode (OLED), or any other suitable type of display screen capable of displaying the content of received text messages and the content of a text message that is being composed on the publisher mobile device (104). The microchip (105) may be any tangible hardware processor(s) or microprocessor(s) for executing the functionalities of the publisher mobile device (102). More specifically, the microchip (105) executes the software application(s) that provide functionalities such as browsing, text messaging, maintaining a contact list and making phone calls, etc. The TMS input/output module (106) may be a virtual keyboard, a physical keyboard, or any other input/output device(s) or button(s) that allows the publisher to compose text messages and receive and read text message responses.

Continuing with FIG. 1, the global textsite platform (108) is a framework for providing publishers with publishing tools for authoring content that is accessible via a text messaging service (TMS). The TMS may be, for example, Short Messaging Service (SMS), Multi-media Messaging Service (MMS), Enhanced Messaging Service (EMS), or any other text messaging service which is now known or later developed. In one or more embodiments of the invention, a textsite is one or more pages of content that is made globally accessible via a TMS. Similar to websites known today, which are made globally accessible via the Internet, a textsite includes a homepage and one or more text pages that are hierarchically and/or organizationally linked to the homepage for browsing information contained on one or more text pages of the textsite.

Figure 10:
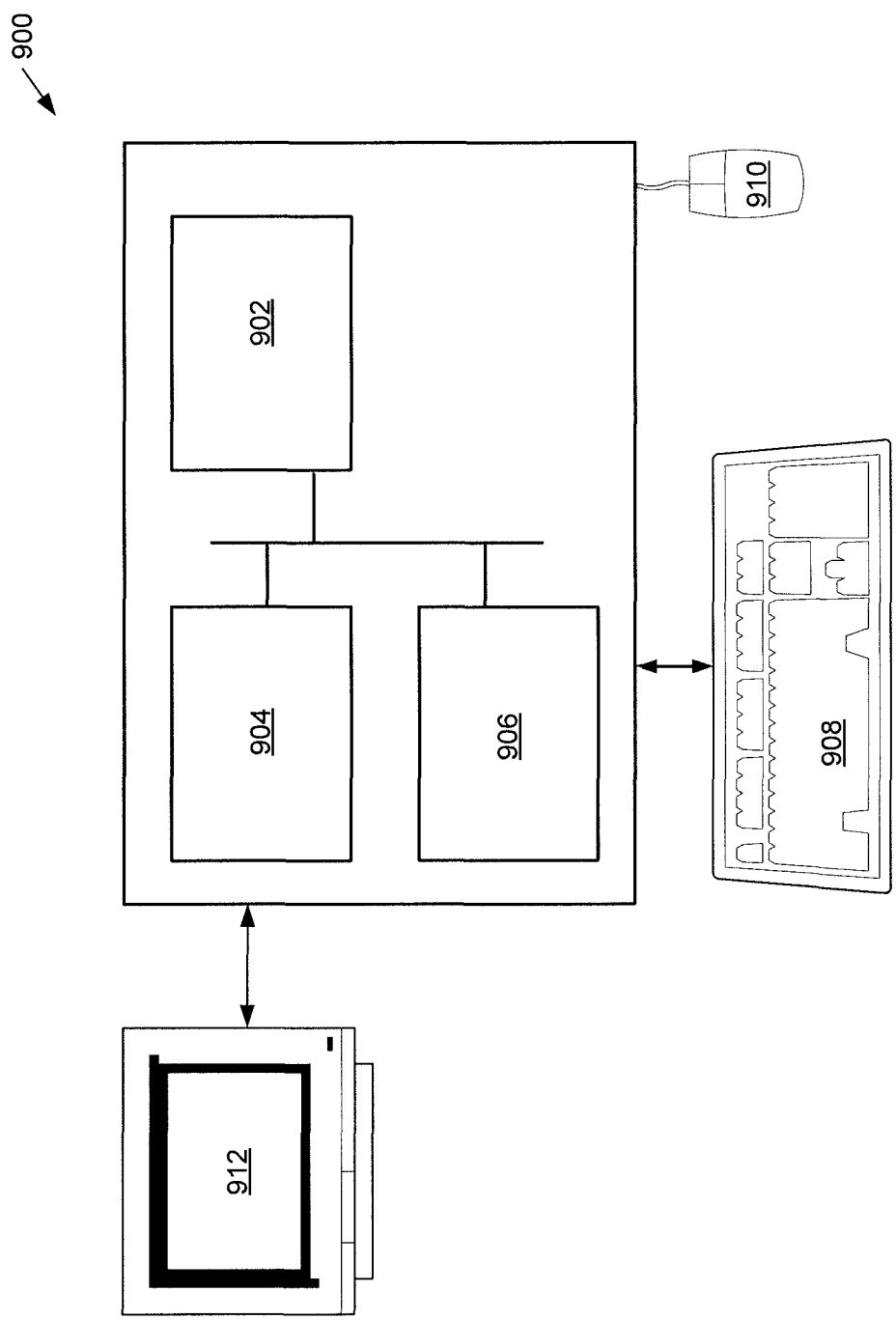
FIG. 10 shows a flow diagram of a computer system in accordance with one or more embodiments of the invention.

In one or more embodiments of the invention, the global textsite platform (108) executes on one or more computing device(s) (e.g., a server, a computer system as shown in FIG. 10 and described below, etc.) and may be hosted by an entity, such as a corporation. In one or more embodiments of the invention, the global textsite platform (108) is associated with a platform syntax that is specific to the global textsite platform (108) and that facilitates communication via a TMS. In one or more embodiments of the invention, the global textsite platform (108) may be associated with different unique phone numbers or codes corresponding to each different geographic locations. Alternatively, a single, unique global number/code may be associated with the global textsite platform (108).

In one or more embodiments of the invention, the global textsite platform (108) includes numerous components including a repository (110), a server (118), publishing tools (114), and an agent (115). Each component is described below in related to FIG. 1 except for the agent (115), which is described with respect to FIG. 2.

The repository (110) is configured with functionality to store keywords (112). The repository may be any data structure (flat file, hierarchical file, relational database, enterprise-wide database, etc.) capable of storing data, regardless where or in what form the data originates. Keywords (112) may be reserved or pre-designated keywords maintained by the platform as part of the platform syntax, and publisher keywords that are registered by publishers for each textsite authored by a publisher. In one or more embodiments of the invention, pre-designated keywords and publisher registered keywords are unique. That is, no two keywords from the group of keywords that are pre-designated as platform syntax or the group of keywords provided by a publisher, are allowed to be identical. In fact, in one or more embodiments of the invention, the keywords (114) are closely controlled by the global textsite platform in an effort to eliminate duplicates. Navigating keywords, which a publisher defines for a textsite that is associated with a unique registered keyword, are also used. Navigating keywords are not required to be unique. For example, two distinct publishers with distinct registered keywords representing a first and a second textsite may use the same navigating keyword for different text pages associated with the first and second textsites.

In one or more embodiments of the invention, the global textsite platform (108) is configured with functionality to receive a unique keyword from a publisher and create a textsite (118) on behalf of the publisher. Further, the global textsite platform (108) is configured with functionality to receive content authored by the publisher using the publishing tools (114) provided by the global textsite platform (108). In one or more embodiments of the invention, publishing tools (114) may include any software or hardware tool that aids a publisher in authoring content for a textsite to the global textsite platform (108). Publishing tools (114) may be maintained by the global textsite platform (108). For example, in one or more embodiments of the invention, publishing tools (114) may include, but are not limited to, a registration service that registers unique keywords for each textsite, a text messaging protocol for sending and receiving text messages via a TMS, a page status tool for displaying the number of visits a particular publisher textsite has received, a tool for printing a flyer to advertise a registered keyword associated with a created textsite, a tool for integrating content from third-party websites with a created textsite, or any other suitable tool for authoring content for a textsite. The text messaging protocol, for example, may be a protocol that specifies syntax and semantics for exchanging messages via a TMS with the global textsite platform (108).

The global textsite platform (108) also includes a server (116) configured to host the plurality of textsites (118) created and maintained by the global textsite platform (108) on behalf of publishers. Those skilled in the art will appreciate that the server (116) may be any computing device with a large storage capacity for hosting the plurality of textsites (118).

More details of how a publisher registers and publishes content for a textsite may be found in co-pending related application with the application Ser. No. 12/728,165, the subject matter of which has been incorporated by reference above.

Figure 2:
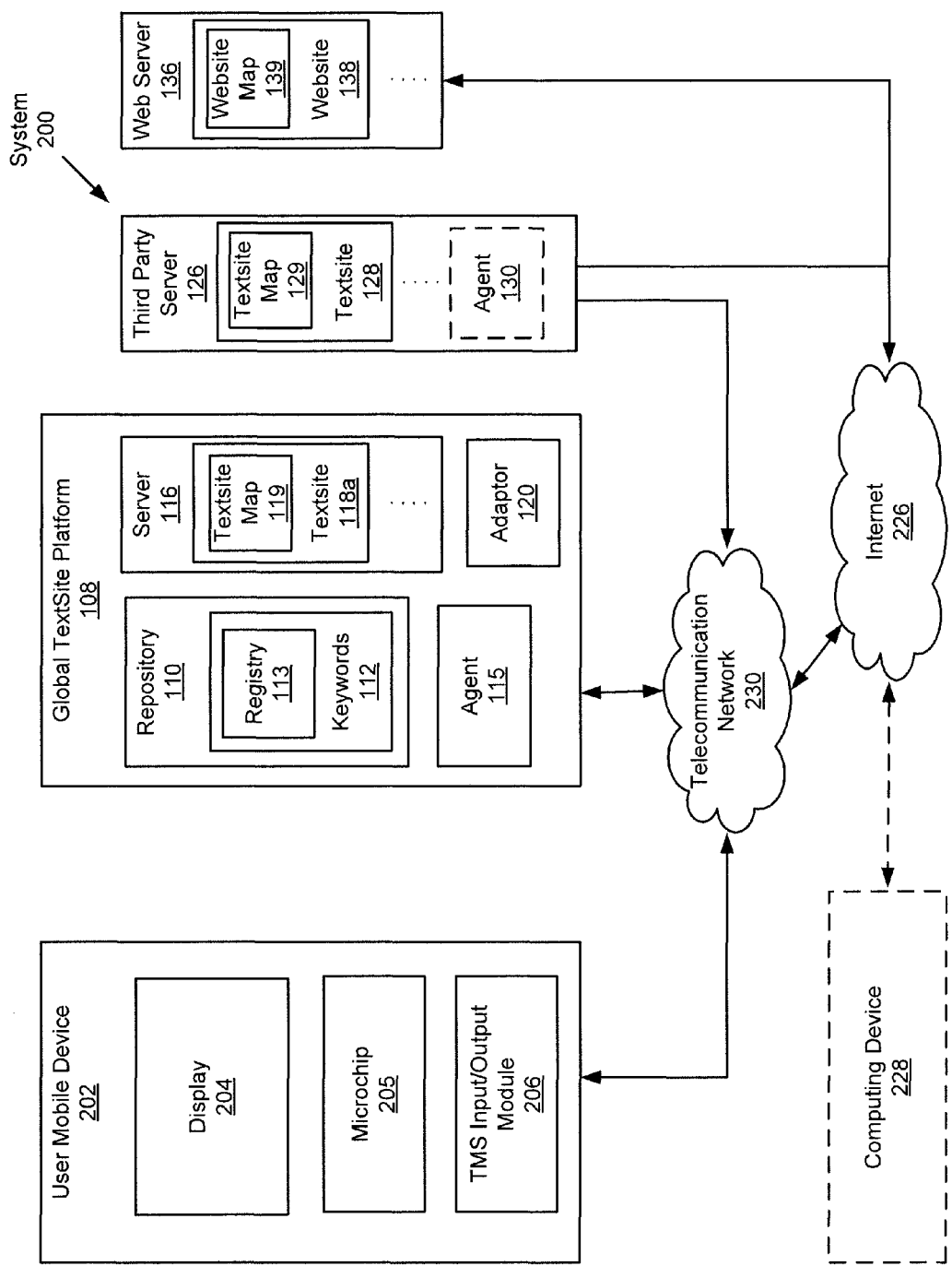
FIG. 2 shows a flow diagram of a system from the perspective of a user in accordance with one or more embodiments of the invention.

FIG. 2 shows a flow diagram of a system (200) for accessing content from a user's perspective in accordance with one or more embodiments of the invention. Specifically, FIG. 2 shows the global textsite platform (108) of FIG. 1 with additional details, a user mobile device (202), a third party server (126) hosting a textsite (128), and a web server (136) hosting a website (138) having contents converted by the global textsite platform (108) to be accessible via TMS. As shown in FIG. 2, these components are connected via the telecommunication network (230) and/or the Internet (226).

In one or more embodiments of the invention, the global textsite platform (108) includes a repository (110) for storing keywords (112), a server (116) configured to host a plurality of textsites (e.g., textsite (118a)), an agent (115), and an adaptor (120). The publishing tools (114) are omitted in FIG. 2 for clarity. In one or more embodiments, a portion of the keywords (112) is organized as a registry (113) storing a number of registered unique keywords each used as a site identifier and associated with metadata describing a mechanism for accessing corresponding site content such as stored in one of textsite (118a), textsite (128), website (138), etc. In one or more embodiments, the registered unique keywords (i.e, used as site identifiers) are registered as described with respect to FIG. 1 above with relevant information processed into the associated metadata.

In one or more embodiments, the textsite (118a) may be hosted by the global textsite platform (108) on behalf of a first publisher or may be an in-house textsite maintained by the global textsite platform (108). In such embodiments, the metadata associated with the registered unique keyword (i.e, used as site identifiers) includes an internal link to the textsite (118a) within the global textsite platform (108).

In one or more embodiments, the textsite (128) is published by a second publisher that has registered with the global textsite platform (108) but is hosted on a separate third party server (126). In such embodiments, the metadata associated with the registered unique keyword (i.e, used as site identifier) includes an access path for the global textsite platform (108) to access the third party server (126) via the telecommunication network (230) and/or the Internet (226). In one or more embodiments, the third party server (126) may include agent (130) configured with similar functionalities as those of the agent (115). For example, the agent (130) may be provided to an operator of the third party server (126) by an operator of the GTP (108) under a pre-determined business agreement (e.g., a license agreement).

In one or more embodiments, contents of the website (138) are converted by the global textsite platform (108) to be accessible to a user via TMS. In such embodiments, the metadata associated with the registered unique keyword includes an access path for the global textsite platform (108) to access the web server (136) via the Internet (226) and identifies whether the contents of the website (138), or a portion thereof, are converted dynamically (i.e, on demand) or statically (i.e, pre-converted and stored). More specifically, a textsite may be static, where information is not changing often and the user's location or other parameters are not taken into account when the user requests a home page of a static textsite. A static textsite is physically stored on the GTP platform, and can be altered when needed by the developer/publisher by accessing the GTP platform via a TMS. Alternatively, textsite may be dynamic (which may be referred to as a text application), in which case the user's location or other parameter may be considered when responding to a user message request for a textsite, and/or the textsite information may be changing often. A dynamic textsite may be a webpage or may be also stored on the GTP platform.

Further as shown in FIG. 2, the user mobile device (202) is operatively connected to the global textsite platform (108) and the third party server (126) via a telecommunication network (230). The user mobile device (202) includes a display (204), a microchip (205), and a TMS input/output module (206). Those skilled in the art will appreciate that the aforementioned global textsite platform (108) components and user mobile device (202) components are capable of the same functionality described above with respect to FIG. 1, one difference being that the components of the user mobile device (202) include functionality to execute software, display text messages, and take TMS input from a user and output TMS responses to the user browsing a textsite rather than a publisher.

In one or more embodiments of the invention, a user is defined as a person or entity accessing content published by publishers and registered with the global textsite platform (108). As noted above, the published and registered content may be hosted by the global textsite platform (108), hosted on the third party server (126), or converted from a website (138). In one or more embodiments of the invention, a user is a person or entity with a mobile device that does not have a data plan subscription. Rather, the user is able to obtain data using the mobile device only via a TMS. That is, embodiments of the invention pertain specifically to users accessing content only via a TMS. Those skilled in the art will appreciate, however, that although embodiments of the invention target users that communicate via a TMS, the invention is not limited to such users. Specifically, while embodiments of the invention are directed to providing access to textsites to users using a mobile phone via a TMS, some users may be provided with the capability to access content on the global textsite platform (108) via a computing device (228) that is connected to the Internet (226). For example, in one or more embodiments, a user may use a text message emulator executing on the computing device (228) to connect to the global textsite platform (108) via the Internet (226). Alternatively, users with smart phones and/or mobile devices that support Internet browsing functionality could access content on the global textsite platform (108) using the Internet (226).

In the user system (200) of FIG. 2, the global textsite platform (108) is configured to receive a text message from the user mobile device (202) that includes a request to access a textsite hosted by the global textsite platform (108). Further, the global textsite platform (108) is configured to process the request received from the user mobile device (202), and to provide the content from the desired textsite to the user's mobile device (202) via a TMS.

To facilitate this interaction with a user mobile device (202), the global textsite platform (108) includes an agent (115). In one or more embodiments of the invention, the agent (115) may be software that is the component of the global textsite platform (108), which communicates with a user mobile device (202). Specifically, the agent (115) is configured with functionality to receive a text message (i.e, a user message) from a user mobile device (202), parse the text message for the relevant keywords or platform-specific syntax, and respond to the user request by identifying and retrieving the content from the requested textsite/converted website for delivering back to the user mobile device (202) in accordance with one or more embodiments of the invention. In one or more embodiments, the content is delivered to the user mobile device (202) in a text message sent from the global textsite platform (i.e, a GTP message).

In one or more embodiments of the invention, the agent (115) is configured to identify, based on the registry (113), a registered unique keyword (i.e, used as site identifier) in the user message as a request to access the textsite (118a) hosted on the global textsite platform (108) or the textsite (128) hosted on the third party server (126). Accordingly, the agent is configured to access the textsite (118a) or the textsite (128) using the aforementioned access path included in the associated metadata. In one or more embodiments, the agent (115) is configured to exchange text messages with the user mobile device (202) for navigating a text page hierarchy of the textsite (118a) or the textsite (128). In one or more embodiments, the textsite (118a) and the textsite (128) include textsite map (119) and textsite map (129), respectively, that describe the hierarchical relationships of text pages contained within each textsite (118a, 128). For example, the textsite map (119) and the textsite map (129) may each include a data structure (e.g., graph, tree, linked list, file, database, etc.) containing navigating keywords defined by the respective publisher. Generally speaking, navigating keyword information (e.g., access information such as location, address, or other information enabling access to a text page pointed to by a navigating keyword) and navigation paths among text pages in the textsite (e.g., textsite (118a)) are stored in the textsite map (e.g., textsite map (129)). Specifically, a navigation path leads from one text page to another via intervening text pages accessed using the navigating keywords contained in each of the text pages traversed along the navigation path. A textsite may be navigated, for example based on the textsite map, by exchanging text messages between the agent (115) and the user mobile device (202).

In one or more embodiments of the invention, the agent (115) is configured to identify, based on the registry (113), a registered unique keyword (i.e, used as site identifier) in the user message as a request to access the website (128) hosted on the web server (136). For example, such registered unique keyword may be registered by a publisher of an adaptor plug-in that maps the website map (139) into a global textsite platform syntax suitable for the adaptor (120) to convert contents of the website (138). Accordingly, the agent (115) is configured to activate the adaptor (120) for accessing the website (138) using the aforementioned access path included in the associated metadata. In one or more embodiments, the agent (115) is configured to exchange text messages with the user mobile device (202) and convert between such text messages in the global textsite platform syntax (e.g., navigating keywords) and the website map (139) for navigating a website document hierarchy of the website (188). For example, the mapping between such navigating keywords and the website map (139) may be contained in an adaptor plug-in for the website (138) where the navigating keywords are defined by the publisher of the adaptor plug-in. More details of accessing a website via TMS by exchanging text messages between the agent (115) and the user mobile device (202) are described in reference to FIGS. 3 and 4 below.

In one or more embodiments of the invention, the agent (115) is configured to identify a web URL (i.e, used as website identifier in Universal Resource Locator format) in the user message as a request to access the website (128) hosted on the web server (136). Accordingly, the agent (115) is configured to activate the adaptor (120) for accessing the website (138) using the identified web URL via the Internet (226). The subsequent navigation of the website (139) may be essentially the same as described above.

In one or more embodiments of the invention, the textsite (118a), the textsite (128), and/or the website (138) are configured to integrate contents from each other. In such embodiments, the textsite map (119), the textsite map (129), and/or the website map (139) are configured to include registered unique keywords (i.e, used as site identifiers) of other textsites and/or websites, which may be included in user text messages for redirecting the user mobile device (202) from one site (e.g., one of the textsite (118*a*), the textsite (128), and the website (138)) to another during navigation of textsite content or converted website content.

In one or more embodiments of the invention, the aforementioned text messages exchanged between the user mobile device (202) and the global textsite platform (108), and more specifically between the user mobile device (202) and the agent (115), are of the same TMS protocol. Alternatively, text messages exchanged may include more than one TMS protocol. For example, the user messages may be SMS and the GTP messages may be MMS. Additional combinations are also possible in other examples.

Although the description above uses the user mobile device (202) in various example embodiments, those skilled in the art will appreciate that similar functionalities may be achieved by substituting the user mobile device (202) with the computing device (228). Further, the aforementioned redirecting functionality may be adapted to allow browsing of website (139) using the computing device (228) to be redirected to accessing a textsite (e.g., textsite (118*a*) or textsite (128)) using the user mobile device (202) and vice-versa.

Although the GTP data (e.g., keywords, registry, textsite map, etc.) shown in FIG. 2 above are described in specific formats and organizations, those skilled in the art with the benefit of this disclosure will recognize that GTP data may be in other formats or organizations without deviating from the spirit of the invention.

Figure 3:
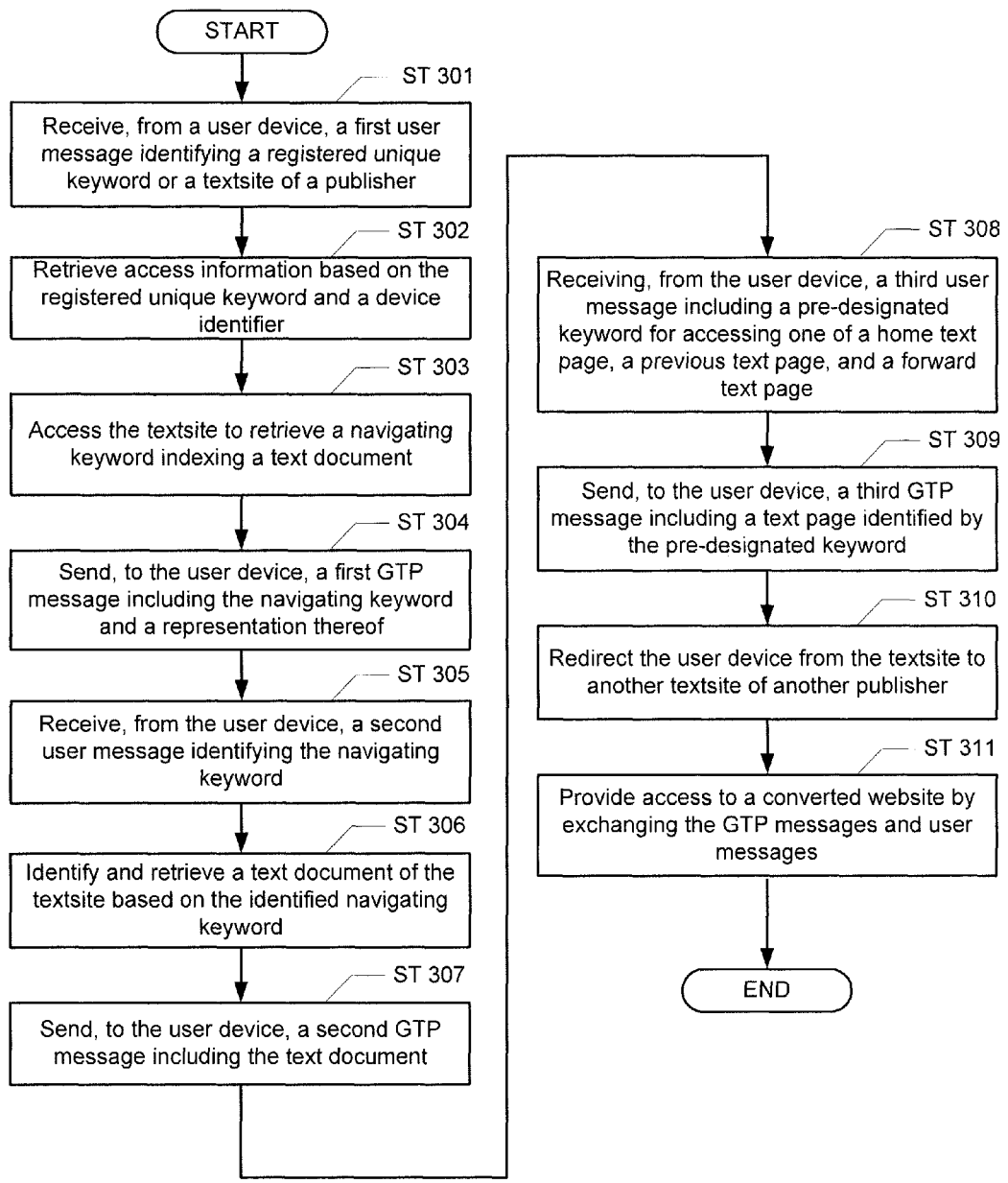
FIG. 3 shows a flow chart for providing access to content by a global textsite platform in accordance with one or more embodiments of the invention.

FIG. 3 shows a flow chart for accessing content of one or more textsites in accordance with one or more embodiments of the invention. More specifically, FIG. 3 shows a flow chart describing the process for accessing content from the global textsite platform (GTP) perspective, in which the platform provides users (i.e, users accessing content authored by publishers) with access to content maintained in the form of textsites by the GTP. In one or more embodiments of the invention, the method of FIG. 3 may be practiced using the GTP described in reference to FIGS. 1 and 2 above. In one or more embodiments of the invention, one or more of the steps shown in FIG. 3 may be omitted, repeated, and/or performed in a different order than that shown in FIG. 3. Accordingly, the specific arrangement of steps shown in FIG. 3 should not be construed as limiting the scope of the invention.

Initially in ST 301, a first user message is received, from a user mobile device that identifies a registered unique keyword maintained by the GTP. As described above, the registered unique keyword may be registered with the GTP by a publisher of a textsite identified by the registered unique keyword while the user device may be a mobile phone or other computing devices. By sending the registered unique keyword in the first user message, the user is requesting access to (i.e, to browse) the textsite associated with the registered unique keyword. In one or more embodiments of the invention, the GTP and/or the publisher may distribute an advertisement containing the registered unique keyword in a commercial promotion. Accordingly, the user may obtain the registered unique keyword from the advertisement. Alternatively, in one or more embodiments of the invention, the GTP may send, in response to receiving a request from the user device, a GTP message identifying a number of sample registered unique keywords from which the user may select a particular one to be included in the first user message. For example, the sample registered unique keywords may be registered with the GTP by a number of different publishers. In one or more embodiments, the request for a listing of registered unique keywords may be received from the user device in a second user message containing a pre-designated keyword defined specifically for requesting such a listing. Alternatively, in one or more embodiments, the user may request such a listing by simply making a conversationless call to the phone number of the GTP instead of sending the second user message to the same phone number. Using any of the approaches described above, the user may obtain a list of textsites accessible via the GTP using a single phone number (e.g., a local phone number) provided by the GDP according to a geographical location of the user. Accordingly, the user is not required to separately obtain and keep different phone numbers for accessing different textsites using a TMS.

In ST 302, authored content (e.g., access information) associated with the textsite requested by the user is retrieved based on the registered unique keyword extracted from the first user message received at the GTP. In one or more embodiments of the invention, the GTP maintains a registry containing an entry for each registered unique keyword that holds pertinent information of the textsite such as location, network address, access path, and other suitable metadata associated with the textsite. Accordingly, the access information associated with the user requested textsite may be retrieved. For example, such access information may determine whether the requested textsite is hosted on a server of the GTP or a third party server separate from the GTP.

In ST 303, the textsite is accessed based on the retrieved authored content (e.g., access information) to retrieve a navigating keyword. For example, a portion of the navigating keywords of the textsite may be retrieved. In another example, the navigating keyword may be retrieved by retrieving a home text page from the textsite that contains the navigating keyword. Generally speaking, some navigating keyword may be an alphanumeric string (e.g., location, Pita Wraps, Panini, Entrees, etc.) that is meaningful to the user but requires many keys to enter into the user device while other navigating keyword may be a short string (e.g., loc, PW, P, E, 1, 2, 3, etc.) that is easy to enter but less meaning to the user for selection. To assist the user in selecting a navigating keyword from a GTP message and to key in the selected navigating keyword when composing a reply user message, a cryptic navigating keyword (e.g., loc, PW, P, E, 1, 2, 3, etc.) may be associated with a meaningful label (e.g., location, Pita Wraps, Panini, Entry, etc.) and displayed together (e.g., loc>location, PW>Pita Wraps, P>Panini, E>Entrees, 1>location, 2>Pita Wraps, 3>Panini, etc.) in the text page delivered via the GTP message. Similarly, a meaningful navigating keyword (e.g., location, Pita Wraps, Panini, Entry, etc.) may be associated with a short hand identifier (e.g., loc, PW, P, E, 1, 2, 3, etc.) and displayed together (e.g., loc>location, PW>Pita Wraps, P>Panini, E>Entrees, 1>location, 2>Pita Wraps, 3>Panini, etc.) in the text page delivered via the GTP message. The meaningful label and the short hand identifier are referred to as a representation of the navigating keyword. In one or more embodiments, representations of the navigating keyword may also include formats different from the meaningful label and/or the short hand identifier.

In ST 304, a first GTP message containing the retrieved navigating keyword is sent to the user device in response to receiving the first user message. In one or more embodiments, the first GTP message includes the retrieved portion of the textsite navigating keywords. In one or more embodiments, the first GTP message includes the text page containing the retrieved navigating keyword. For example, the home text page of the textsite may be sent to the user device in the first GTP message as a reply to the first user message containing the registered unique keyword. Accordingly, the user may access a desired text page from the home text page by selecting a corresponding navigating keyword contained in the home text page. In one or more embodiments, a text page also contains, as defined by the publisher, representations of included navigating keywords for ease of user selection. For example, each of the navigating keywords in the home text page sent in the first GDP message may be accompanied by a meaningful label or a short hand identifier. Accordingly, the user may specify (or identify) a desired text page by including either a corresponding navigating keyword or a representation of such navigating keyword in a second user message replying to the first GTP message. In ST305, this second user message is received at the GTP.

As noted above, navigating keyword information (e.g., access information such as location, address, or other information enabling access to a text page pointed to by a navigating keyword) and navigation paths to text pages in the textsite are stored in the textsite map. In one or more embodiments of the invention, information regarding meaningful labels, short hand identifiers, or other keyword representations for a navigating keyword in a text page is also included in the textsite map. In ST 306, the desired text page is identified according to the textsite map based on either the navigating keyword or a representation (e.g., a meaningful label, short hand identifier) thereof extracted from the second user message. Further, the desired text page is retrieved by looking up access information in the textsite map accordingly.

In ST 307, the desired text page is included in a second GTP message and sent, as reply to the second user message, to the device for display to the user.

In ST 308, a third user message is received from the device while displaying the first text page. The third user message includes a pre-designated keyword (e.g., " ", "0", ".", etc.). For example, the pre-designated keyword may be defined specifically for accessing a home text page of the textsite. In response, the GTP sends the home text page to the device in a third GTP message (ST 309). In another example, the pre-designated keyword may be defined specifically for accessing a previous text page sent to the device prior to the text page in a navigation trace. In response, the GTP sends the previous text page to the device in the third GTP message (ST 309). In still another example, the pre-designated keyword may be defined specifically for accessing a forward text page sent to the device subsequent to the text page in the navigation trace. In response, the GTP sends the forward text page to the device in a third GTP message (ST 309). In yet another example, the pre-designated keyword may be defined specifically for subscribing to updates of a currently displayed text page. In response, the GTP sends updated versions of the currently displayed text page in a push mode to the device from time to time in recurring GTP messages (ST 309).

While the description above regarding ST 301 through ST 309 relates to a textsite published by a publisher under a registered unique keyword, the user may obtain another registered unique keyword separately registered with the GTP by another publisher of another textsite. During navigation of the currently displayed textsite, a user message may be received identifying a second registered unique keyword. For example, such user message may include either the second registered unique keyword or a representation thereof. In response, the GTP redirects the user device from the currently navigated textsite to the second textsite (ST 310). Accordingly, the GTP may exchange text messages with the device for navigating the second textsite using a second set of navigating keywords according to a second textsite map of the second textsite. Accordingly, in one or more embodiments, the user may switch back and forth between different textsites published by different publishers without the need to change the phone number to which the text messages are sent in the middle of the textsite navigation.

As described above, there are several different approaches as to how a user may obtain a list of all textsites accessible via the GTP regardless of which publisher authored the content. An additional scenario in which the user may obtain additional registered unique keywords is from a text page having an embedded external link, as authored by the publisher and is consistent with the textsite map. In this scenario, a user message may be redirected to a second or third textsite as described above. Further, the text page may include a short hand identifier for the embedded external link in which case the user message may just include the short hand identifier for quick redirection.

In some scenarios, the second textsite described above is converted from a website, for example, using the adaptor described in reference to FIG. 2 above. In such scenarios, the second navigating keyword may be registered for the website where a corresponding registry entry specifies a particular adaptor plug-in for use to map between a website map of the website and a textsite map converted from the website map. Specifically, a navigating keyword received in a user message during navigation of the converted website is processed using the textsite map, the adaptor plug-in, and the website map to retrieve access information associated with a corresponding webpage. Subsequently, the webpage may be retrieved and converted dynamically (i.e, on demand) into a text page for sending to the user device. Alternatively, a pre-converted text page may be stored and retrieved for sending to the user device (ST 311).

Although the description above generally refers to messages exchanged between the GTP and the user device as text messages transmitted via TMS, those skilled in the art with the benefit of this disclosure will appreciate that the invention is not intended to be limited to exchanges exclusively in text messages or using a TMS. For example, the GTP may provide functionalities to allow a user switching back and forth between browsing textsites via Internet using a computing device and navigating the textsites via telecommunication network using a mobile phone in a seamless fashion with uninterrupted handovers.

Figure 4:
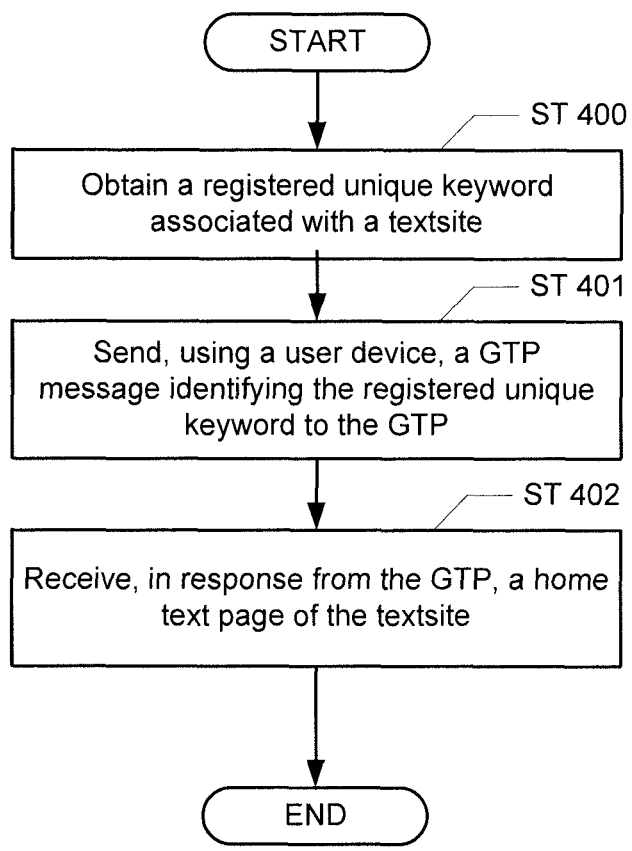
FIG. 4 shows a flow chart for using a global textsite platform in accordance with one or more embodiments of the invention.

FIG. 4 shows a flow chart for accessing content maintained by the global textsite platform by a user in accordance with one or more embodiments of the invention. In one or more embodiments of the invention, one or more of the steps shown in FIG. 4 may be omitted, repeated, and/or performed in a different order than that shown in FIG. 4. Accordingly, the specific arrangement of steps shown in FIG. 4 should not be construed as limiting the scope of the invention.

Initially, a user obtains a registered unique keyword for a desired textsite (ST 400). Specifically, in one or more embodiments of the invention, a user may obtain a registered unique keyword through an advertisement for the registered keyword. Upon obtaining the registered keyword for the desired textsite that the user wishes to browse or obtain information regarding, the user sends, using a mobile device, a text message including the unique keyword to a local number of the global textsite platform (ST 401). More specifically, the user sends a text message via a TMS, such as SMS or MMS, to a local number corresponding to a geographic location of the user. The text message includes the registered keyword for the desired textsite. Those skilled in the art will appreciate that the user may be in any global geographic location when requesting access to a textsite, as access to the platform is globally available to any user with TMS functionality on a mobile device.

Subsequently, the user receives a response from the global textsite platform including the homepage of the textsite that is associated with the registered unique keyword sent by the user (ST 402). At this stage, the user may communicate with the global textsite platform by exchanging a series of text messages (i.e, user messages) and receiving text message responses (i.e, GTP messages) to navigate the textsite.

More details of accessing textsites using a text messaging service may be found in co-pending related application with the application Ser. No. 12/728,165, the subject matter of which has been incorporated by reference above.

Using one or more aspects of the infrastructure and processes described in FIGS. 1-4, embodiments of the invention are directed more specifically toward a system which includes functionality to store the state of a particular user's textsite browsing experience. More specifically, embodiments of the invention use one or more aspects of the systems and methods described above to allow a user browsing a first textsite via text message communication with the GTP to leave the first textsite (while storing the state of that textsite) to browse a second textsite, and subsequently, at a later time, return to the first textsite without having to re-navigate from the homepage of the first textsite (by using the stored state). In other words, the following system and methods describe functionality to store the user's navigation state of a user message (e.g., text message using a TMS).

Figure 5:
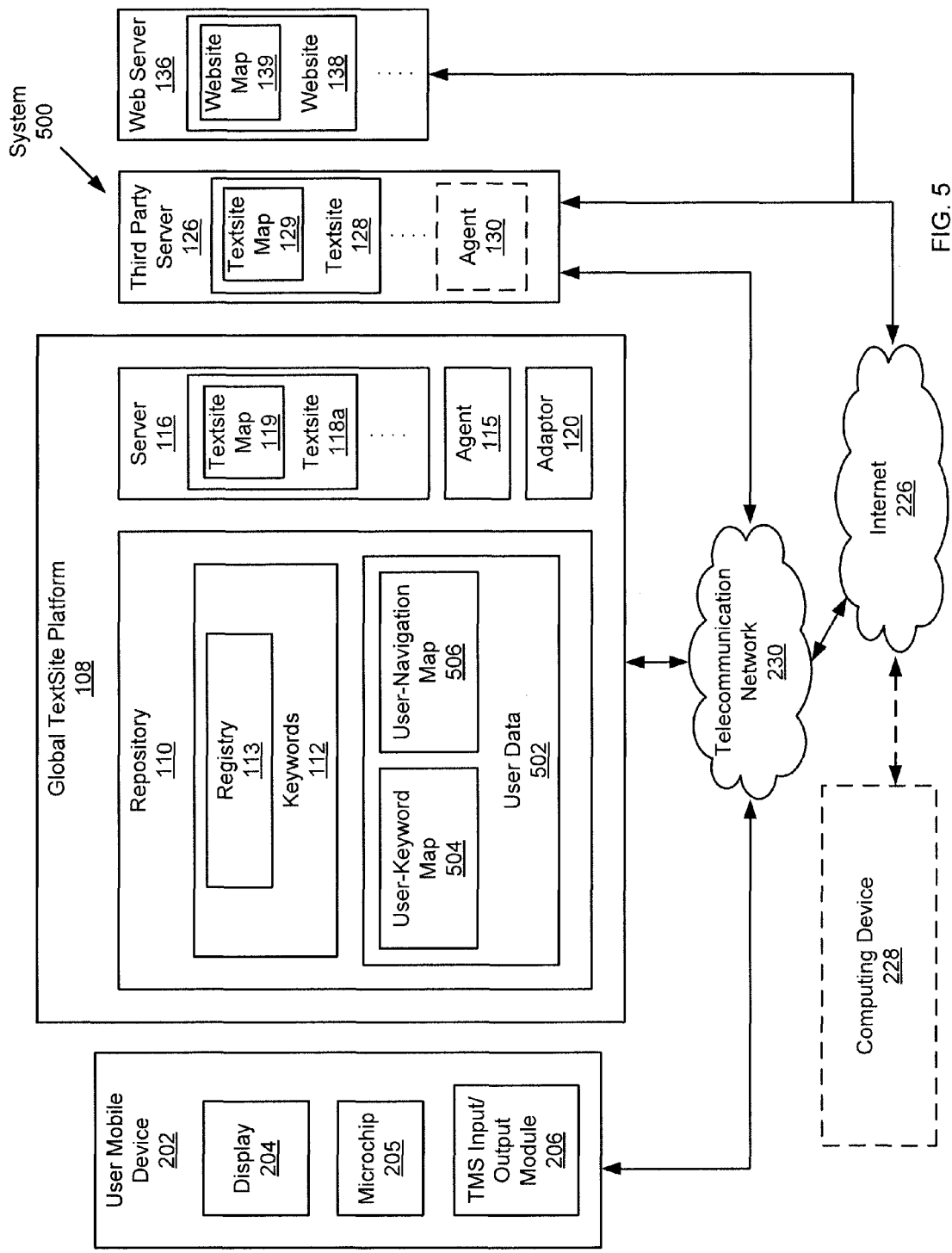
FIG. 5 shows a flow diagram of a system from the perspective of a user in accordance with one or more embodiments of the invention.

FIG. 5 shows a system (500) from the perspective of a user in accordance with one or more embodiments of the invention. Specifically, FIG. 5 shows the global texsite platform (108) of FIG. 2, with additional details in accordance with embodiments of the invention. The system (500) also includes a user mobile device (202), a third party server (126), and a web server (136). In addition, the system (500) includes an optional computing device (228). As shown in FIG. 5, these components are connected via the telecommunication network (230), and/or the Internet (226). One skilled in the art will appreciate that the elements that FIG. 5 has in common with the system of FIG. 2 include similar functionalities as described above. Accordingly, functionalities of each element shown in the system of FIG. 5 is not repeated here for purposes of readability.

In one or more embodiments of the invention, the repository (110) is configured to store user data (502). According to one or more embodiments of the invention, user data (502) may be stored for each user accessing the global textsite platform. Said another way, data stored in user data (502) is specific to the user accessing the global textsite platform (108). For example, user data (502) may be stored for a user accessing the global testsite platform (108) from the user mobile device (202). Although not shown, separate user data may be stored for another user accessing the global textsite platform from another user mobile device (not shown).

According to one or more embodiments of the invention, the user data (502) includes a user-keyword map (504), and a user-navigation map (506). According to one or more embodiments of the invention, the user-keyword map (504), and user-navigation map (506) may be stored using any known form of data structure. Further, according to one or more embodiments of the invention, the user-keyword map (504) and user-navigation map (506) may be stored in the same data structure, or in separate data structures. It is important to note however, that the user-keyword map (504) and user-navigation map (506) are unique to each user. Accordingly, the repository (110) may store numerous user-keyword maps and user-navigation maps. According to one or more embodiments of the invention, the user-keyword map (504) or user-navigation map (506) associated with a particular user is identified using a device identifier. For example, in the system (500), the user-keyword map (504) and the user-navigation map (506) might be associated with a device identifier corresponding to user mobile device (202). According to one or more embodiments of the invention, the device identifier may be any identifier that is unique to the user or device. For example, the device identifier may be a telephone number associated with the user mobile device (202), or any other suitable identifier unique to the user mobile device (202).

As described above, a user may access a text page of a textsite by sending a navigating keyword associated with that textsite. However, unlike the registered unique keywords used to access a textsite, not all navigating keywords are unique. A single keyword may be found in two different textsites and, thus, identify two different text pages. According to one or more embodiments of the invention, the global textsite platform (108) includes functionality to track commonly visited text pages by a user, and the navigation keyword associated with the text page. Thus, the association between a frequently visited text page and a navigating keyword is stored in the user-keyword map (506). More specifically, according to one or more embodiments of the invention, the user-keyword map (504) stores the navigating keyword. The user may specify to use one of the stored keywords by sending a message with a pre-designated syntax or symbol (e.g., ".", "@", etc.) in accordance with the standard text message protocol of the GTP, followed by the stored navigating keyword to direct the global textsite platform (108) to use the user-keyword map (504) to go directly to the frequently visited text page associated with the navigating keyword.

The user data (502) also includes a user-navigation map (506). According to one or more embodiments of the invention, the user-navigation map (506) includes stored associations between the most recently visited text pages, and a navigation state identifier. According to one or more embodiments of the invention, the user-navigation map (506) allows a user to send a navigation state identifier to the global textsite platform (108) and receive a text page associated with the keyword. According to one or more embodiments of the invention, by storing navigation states, a user may simultaneously navigate multiple textsites with the ability to return to the most recent text page of a previously visited textsite.

According to one or more embodiments of the invention, navigation state identifiers are a set of sequential identifiers. Further, according to one or more embodiments of the invention, there are a finite number of navigation state identifiers. Accordingly, navigation state identifiers may be alphabetical (e.g., A-Z), numerical (e.g., 1-100, 1-500, etc.), symbolic (e.g., #, $, %, etc.), a combination of any of these sets of identifiers (e.g., A1, A2, . . . Z9), or any predetermined sequential list of identifiers. According to one or more embodiments of the invention, when all navigation state identifiers in the state have been used (i.e, assigned a text page), the global textsite platform (108) is configured to reassign previously used navigation state identifiers from the beginning of the sequence. The user-navigation map (506) and use of the navigation state identifiers will be explained in further detail in FIGS. 6 and 7A-7B below.

The agent (115), in addition to functionalities mentioned above with respect to FIG. 2, is also configured to parse a received text message for the relevant navigation state identifiers, and respond to the user request by identifying and retrieving the content from the requested text page corresponding to the navigation state identifier in the user message.

Thus, the agent (115) is responsible for determining which navigation state identifier the user has entered in a user message, and subsequently accessing the mapping(s) stored in the user data (502) to determine which text page the GTP needs to send back to the user mobile device (202).

Although the description above uses the user mobile device (202) in various example embodiments, those skilled in the art will appreciate that similar functionalities may be achieved by substituting the user mobile device (202) with the computing device (228). Further, the aforementioned redirecting functionality may be adapted to allow browsing of website (139) using the computing device (228) to be redirected to accessing a textsite (e.g., textsite (118*a*) or textsite (128)) using the user mobile device (202) and vice-versa.

Figure 6:
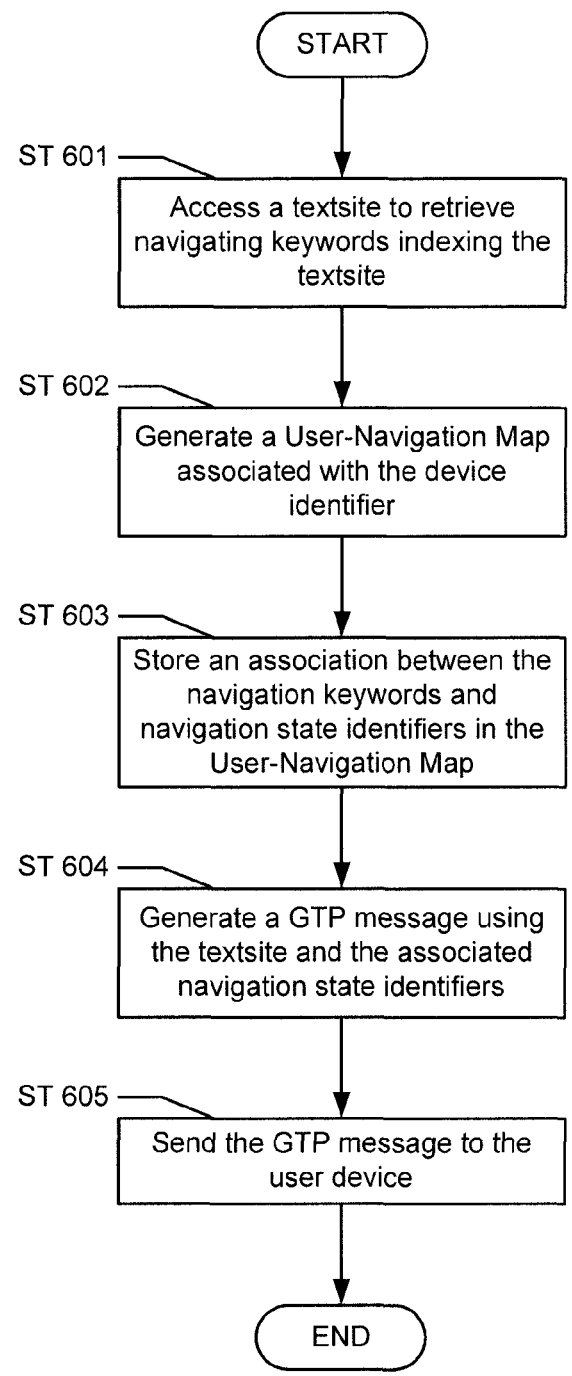
FIG. 6 shows a flow chart for accessing a textsite from a system perspective according to one or more embodiments of the invention.

FIG. 6 is a flow chart for accessing a textsite, according to one or more embodiments of the invention. Specifically, FIG. 6 shows a process for the system of FIG. 5 to set up and store states for multiple user devices access multiple textsites. In one or more embodiments of the invention, the method of FIG. 6 may be practiced using the GTP described in reference to FIG. 5 above. In one or more embodiments of the invention, one or more of the steps shown in FIG. 6 may be omitted, repeated, and/or performed in a different order than that shown in FIG. 6. Accordingly, the specific arrangement of steps shown in FIG. 6 should not be construed as limiting the scope of the invention.

At ST 601, a textsite is accessed to retrieve navigating keywords indexing text pages of the textsite. More specifically, the GTP may receive a user message with a registered unique keyword, obtain a home page for a textsite that corresponds to the registered unique keyword, and then retrieve navigating keywords corresponding to a text page of the textsite in which the user is interested. As described above, navigating keywords may be found in the textsite map, according to one or more embodiments of the invention.

At ST 602, a User-Navigation Map is generated. According to one or more embodiments of the invention, the User-Navigation Map is associated with the device identifier (e.g., mobile phone number), as described above.

At ST 603, an association between the navigating keywords and the navigation state identifiers in the User-Navigation Map is stored. According to one or more embodiments of the invention, the associations begin at the beginning of the sequence. Further, according to one or more embodiments of the invention, the User-Navigation Map allows the global textsite platform to navigate to the associated text page using the navigation state identifier.

At ST 604, a GTP message is generated using the textsite and the associated navigation state identifiers. According to one or more embodiments of the invention, the navigation keywords are modified by the associated navigation state identifiers in the textsite when the GTP message is generated. According to one or more embodiments of the invention, the navigation state identifiers may be listed prior to the navigating keywords, after the navigating keywords, or displayed in some other way that indicates to the user that the navigation keyword is associated with the specified navigation state identifier. When multiple navigation keywords are displayed by the GTP, sequential navigation state identifiers are used to modify each navigating keyword.

At ST 605, the GTP message is sent to the user device. According to one or more embodiments of the invention, the GTP message is sent to the user device for display. According to one or more embodiments of the invention, the user device is identified using the device identifier when sending the GTP message to the user device.

Those skilled in the art will appreciate that the process of FIG. 6 may be repeated for each user device identifier that requests access to a textsite hosted by the GTP. That is, each user device has its own mapping of navigation state identifiers stored in the GTP repository.

Figure 7A:
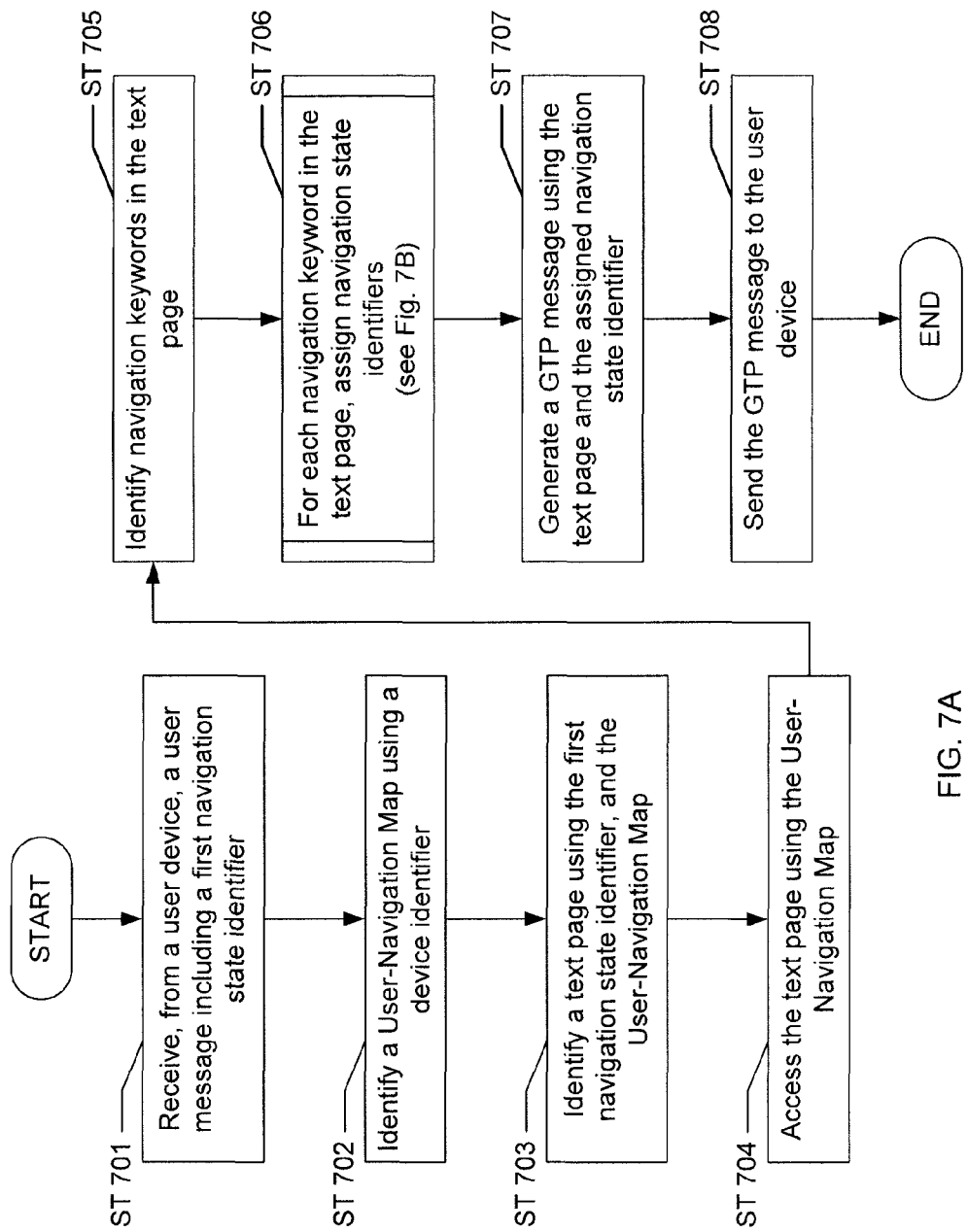
FIGS. 7A-7B show flow charts for accessing a textsite from a system perspective according to one or more embodiments of the invention.

FIG. 7A is a flow chart for accessing a text page, according to one or more embodiments of the invention. In one or more embodiments of the invention, the method of FIG. 7A may be practiced using the GTP described in reference to FIG. 5 above. In one or more embodiments of the invention, the steps in FIG. 7A may be performed after the steps in FIG. 6. In one or more embodiments of the invention, one or more of the steps shown in FIG. 7A may be omitted, repeated, and/or performed in a different order than that shown in FIG. 7A. Accordingly, the specific arrangement of steps shown in FIG. 7A should not be construed as limiting the scope of the invention.

At ST 701, a user message is received from a user device. The user message includes a first navigation state identifier. For example, the user message may include one of the navigation state identifiers sent in the GTP message in FIG. 6.

At ST 702, a User-Navigation Map is identified using a device identifier. As described above, the device identifier may be a telephone number from which the user message was sent that is associated with the user device, or any other identifier that is unique to the user device.

At ST 703, a text page is identified using the first navigation state identifier and the User-Navigation Map. For example, an association between the first navigation state identifier and the identified text page may be stored in the User-Navigation Map.

At ST 704, the identified text page is accessed using the User-Navigation Map. For example, according to one or more embodiments of the invention, the User-Navigation Map may store data regarding the text page that allows the text page to be accessed. For example, this may include a registered unique keyword, a universal resource locator (URL), or any other data used to navigate to a text page.

At ST 705, navigating keywords in the identified text page are obtained. For example, the identified text page may include navigating keywords to other text pages navigable from the identified text page.

Figure 7B:
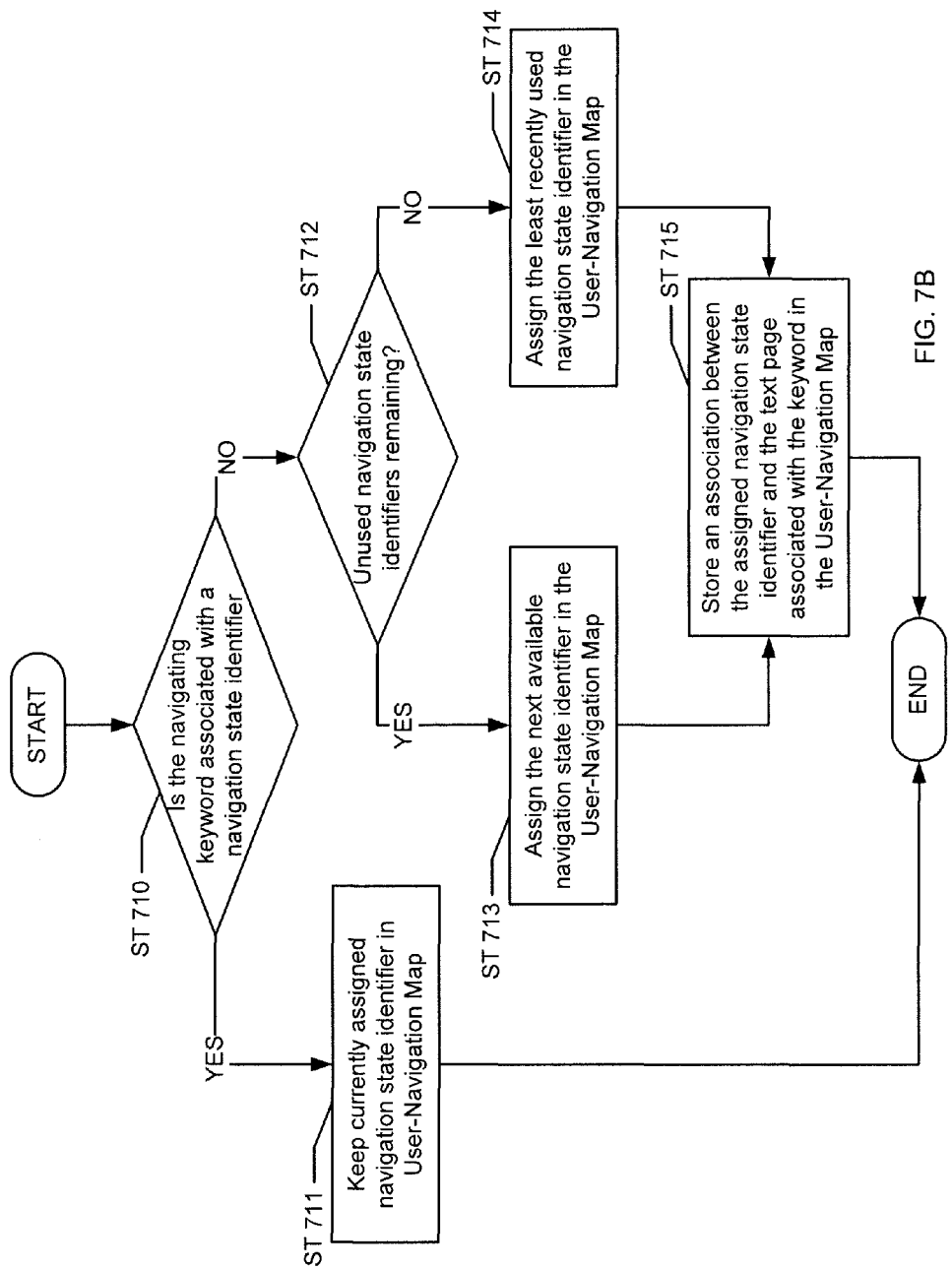

At ST 706, for each navigation keyword identified, a navigation state identifier is assigned. As described above, the navigation state identifier that is assigned is user device specific. Turning to FIG. 7B, the steps shown in FIG. 7B depict assigning navigation state identifiers to the navigating keywords.

FIG. 7B illustrates a flow chart depicting steps required for each identified navigating keyword in a text page in order to assign a navigation state identifier to each navigating keyword. Thus, although these steps are only shown once, they are intended to be repeated for each identified navigating keyword in a text page.

At ST 710, a determination is made regarding whether the navigating keyword is associated with a navigation state identifier. For example, the User-Navigation Map may already include an association between the text page associated with the navigating keyword and a navigation state identifier. This may occur, for example, when a user has previously visited the requested text page. At ST 711, in the event that the navigating keyword is already assigned to a navigation state identifier, the current assignment is retained in the Use-Navigation Map, and the flowchart ends.

Returning to ST 710, in the case that the text page associated with the navigating keyword is not associated with a navigation state identifier in the User-Navigation Map, the flow chart continues at ST 712. At ST 712, a determination is made regarding whether unused navigation state identifiers remain. As described above, according to one or more embodiments of the invention, the navigation state identifiers are a finite sequential set of identifiers. In the case that not all of the navigation state identifiers have been used, the flow chart continues at ST 713. At ST 713, the next available (i.e, not currently assigned) navigation state identifier in the finite sequential set of identifiers is assigned to the navigation state identifier and the corresponding text page in the User-Navigation Map.

Returning to ST 712, in the case that there are no remaining unused navigation state identifiers, the flow chart continues at ST 714. At ST 714, the least recently used navigation state identifier is assigned to the navigating keyword and associated text page. For example, if the navigation state identifiers are alphabetical characters (i.e, A-Z), once Z is assigned, the next navigation state identifier to be assigned is A. After A is reassigned, the next navigation state identifier to be assigned is B (i.e, the least recently used navigation state identifier).

At ST 715, the association between the assigned navigation state identifier and the text page associated with the navigating keyword is stored in the User-Navigation Map.

Returning to FIG. 7A, at ST 707, a GTP message is generated using the identified text page and the assigned navigation state identifiers. It is important to note that this identified text page is not associated with any of the text pages assigned navigation state identifiers at ST 706. Rather, the identified text page in the GTP message includes links to the text pages described in FIG. 7B. According to one or more embodiments of the invention, the navigating keywords that were identified in ST 705 are modified by the navigation state identifiers assigned in FIG. 7B as part of ST 707.

At ST 708, the generated GTP message is sent to the user device. According to one or more embodiments of the invention, the GTP message is sent for display on the user device.

Figure 8:
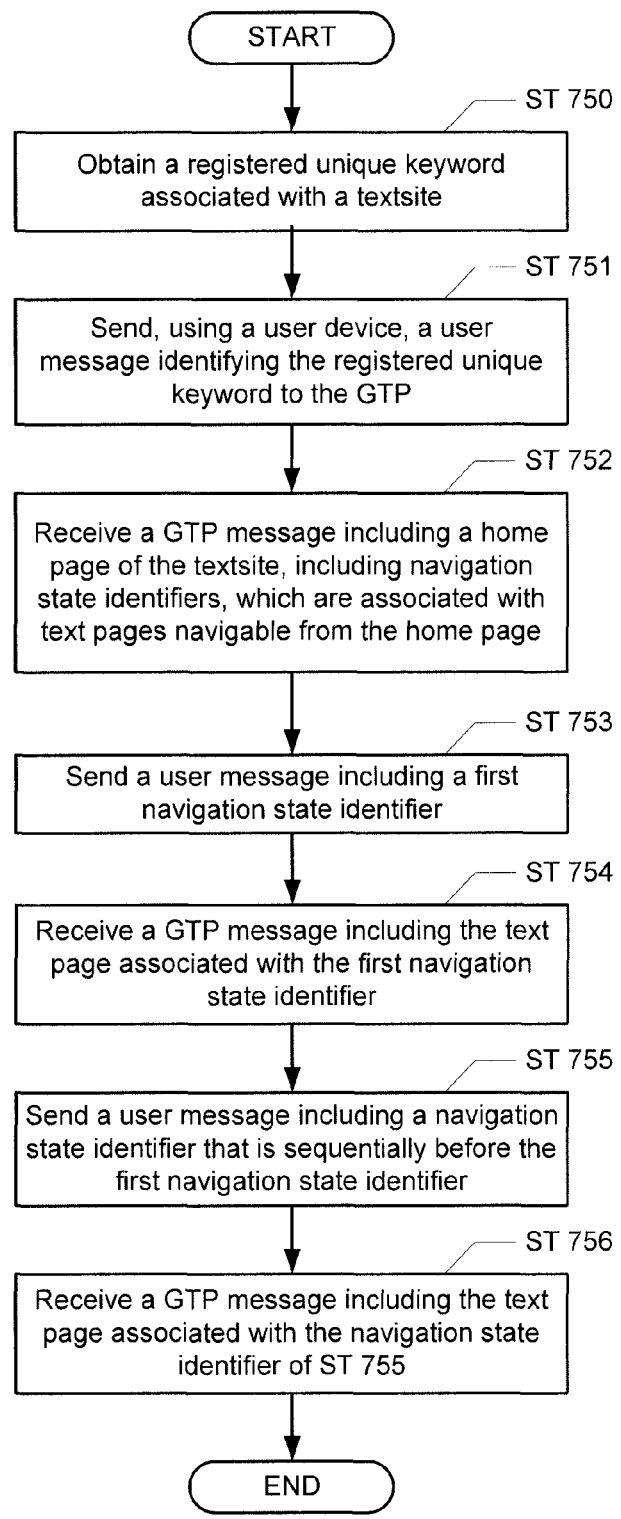
FIG. 8 shows a flow chart for accessing a textsite from a user's perspective according to one or more embodiments of the invention.

FIG. 8 shows a flow chart for accessing a textsite from a user's perspective according to one or more embodiments of the invention. The method of FIG. 8 may be practiced using the User Mobile Device (502) described in reference to FIG. 5 above. In one or more embodiments of the invention, one or more of the steps shown in FIG. 8 may be omitted, repeated, and/or performed in a different order than that shown in FIG. 8. Accordingly, the specific arrangement of steps shown in FIG. 8 should not be construed as limiting the scope of the invention.

Initially, at ST 750, a user obtains a registered unique keyword for a desired textsite. Specifically, in one or more embodiments of the invention, a user may obtain a registered unique keyword through an advertisement for the registered keyword. Upon obtaining the registered keyword for the desired textsite that the user wishes to browse or obtain information regarding, the user sends, using a mobile device, a user message including the unique keyword to a local number of the global textsite platform (ST 751). Those skilled in the art will appreciate that the user may be in any global geographic location when requesting access to a textsite, as access to the platform is globally available to any user with TMS functionality on a mobile device.

Subsequently, the user receives a response from the global textsite platform in the form of a GTP message, including a home page of the textsite that is associated with the registered unique keyword sent by the user (ST 752). The home page received includes navigation state identifiers, which are associated with text pages navigable from the home page. According to one or more embodiments of the invention, the home site includes navigation keywords identifying navigable pages, and those navigation keywords are modified by navigation state identifiers specific to the user.

At this stage, at ST 753, the user may communicate with the global textsite platform by sending a user message including a first navigation state identifiers that appear in the GTP message received in ST 752.

At ST 754, the user receives a GTP message including the text page associated with the navigation state keyword send at ST 753. According to one or more embodiments of the invention, this text page may include navigation state identifiers corresponding to further text pages navigable from the current text page.

At ST 755, the user sends a user message including a navigation state identifier that is sequentially before the first navigation state identifier (i.e., the navigation state identifier of ST 752). The user may send a user message in response to a previously received GTP message for a textsite that the user wishes to revisit or continue browsing. In one or more embodiments of the invention, a user may select a previous GTP message from a text message inbox (or any other place that the text message may be stored on the user mobile device) on the user's mobile device and reply to the selected previous GTP message in order to re-start navigation of that particular textsite, at the text page which was most recently visited in that textsite. Thus, when the previously received GTP message was generated, navigation state identifiers were assigned to text pages navigable from the previously visited text page.

At ST 766, the user receives a GTP message including the text pages associated with the navigation sate identifier of ST 755. According to one or more embodiments of the invention, this text page may include navigation state identifiers that are sequentially after the first navigation state identifier, because the first available navigation state identifier in the sequence is used.

In this manner, for example, a user who first browsed a textsite for a restaurant, and subsequently started a new user message thread for movie show times, for example, would then be able to leave the movie show times text page of a movie search textsite, and select the last GTP message from a text message inbox on the user's mobile phone regarding the restaurant textsite to continue browsing from the last text page of the restaurant textsite. Similarly, the user may then re-select the last GTP message for the movie show time textsite to continue navigating that textsite from the most recently viewed text page on movie show times. As the system is configured to remember a finite number of states, the user may browse up to the finite number of textsites simultaneously without losing the last text page or state at which each textsite was browsed.

FIGS. 9A-9F show various screen shots illustrating examples of accessing content hosted by a global textsite platform in one or more embodiments of the invention. Although FIGS. 9A-9F show implementation examples of embodiments of the invention, those skilled in the art will appreciate that there may be other ways in which to implement embodiments of the invention, and that the example screen shots are not meant to limit the scope of the invention. Throughout FIGS. 9A-9F, a text page delivered in a GTP message and the GTP message delivering the text page may both be referred to using the same reference numerals.

Figure 9A:
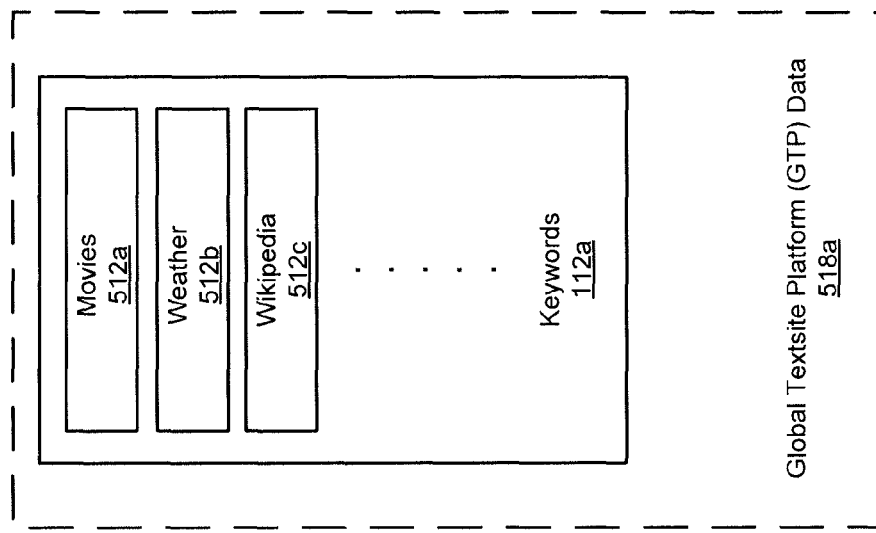
FIGS. 9A-9F show screen shorts of an exemplary global textsite platform in accordance with one or more embodiments of the invention.
Figure 9A:
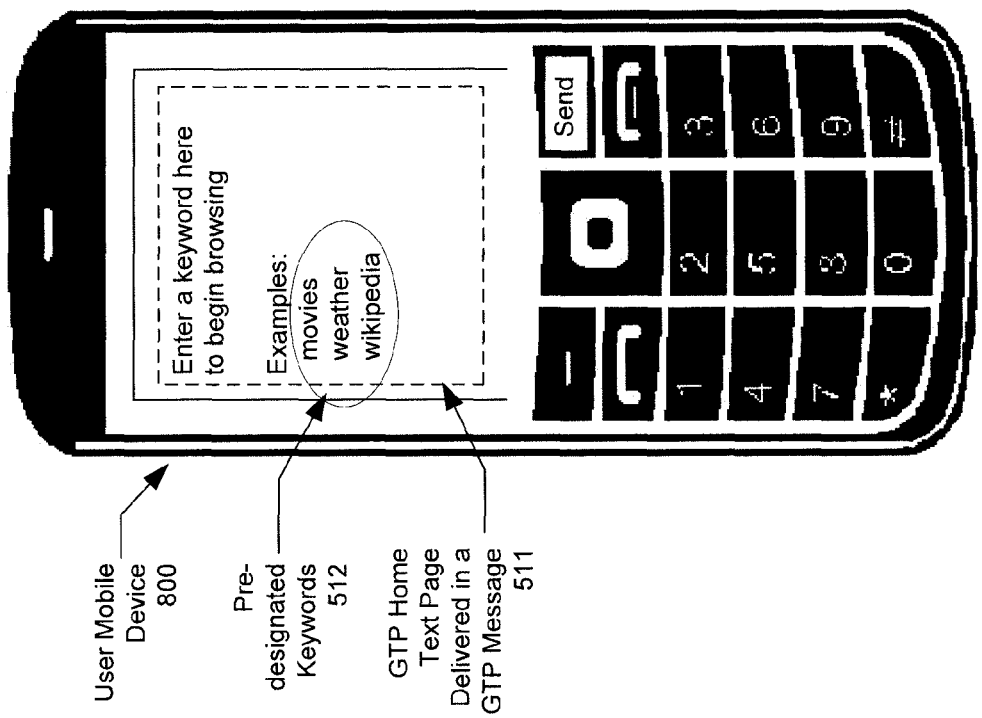

FIG. 9A shows the user mobile device (800) displaying an example GTP home text page, which is delivered via TMS in a GTP message (511). As noted above, this GTP home text page may be sent in the GTP message (511) in response to a request from a user. For example, the user may send a request message in a pre-designated format (e.g., with blank content or with content associated with another pre-designated keyword) using a phone number of the GTP to request the GTP home text page. In another example, the user may have made a conversationless telephone call to the phone number of the GTP to request the GTP home text page. As shown in FIG. 5A, the GTP home text page includes pre-designated keywords (512) listed as movies, weather, and Wikipedia. For example, these pre-designated keywords are stored in the keywords (112a) of GTP data (518a) corresponding to the keywords (112) shown in FIG. 2 above. The keywords (112a) includes pre-designated keyword entries of movies (512a), weather (512b), and Wikipedia (512c) corresponding to sample textsites or generic textsites included in and/or hosted by the GTP.

Figure 9B:
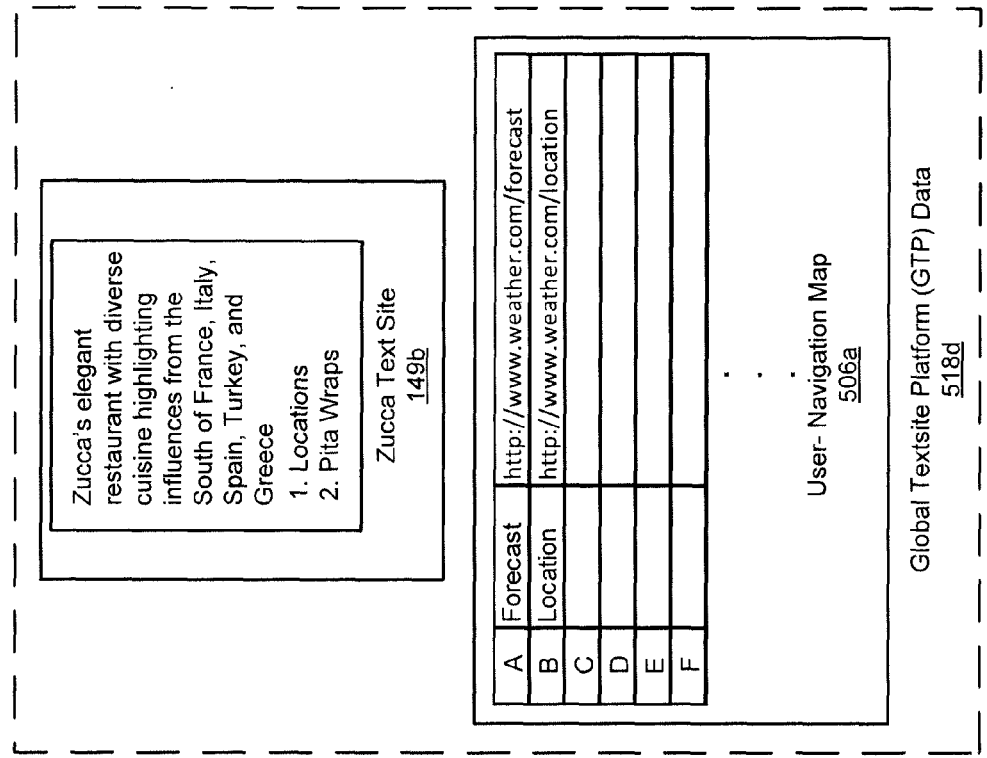
Figure 9B:
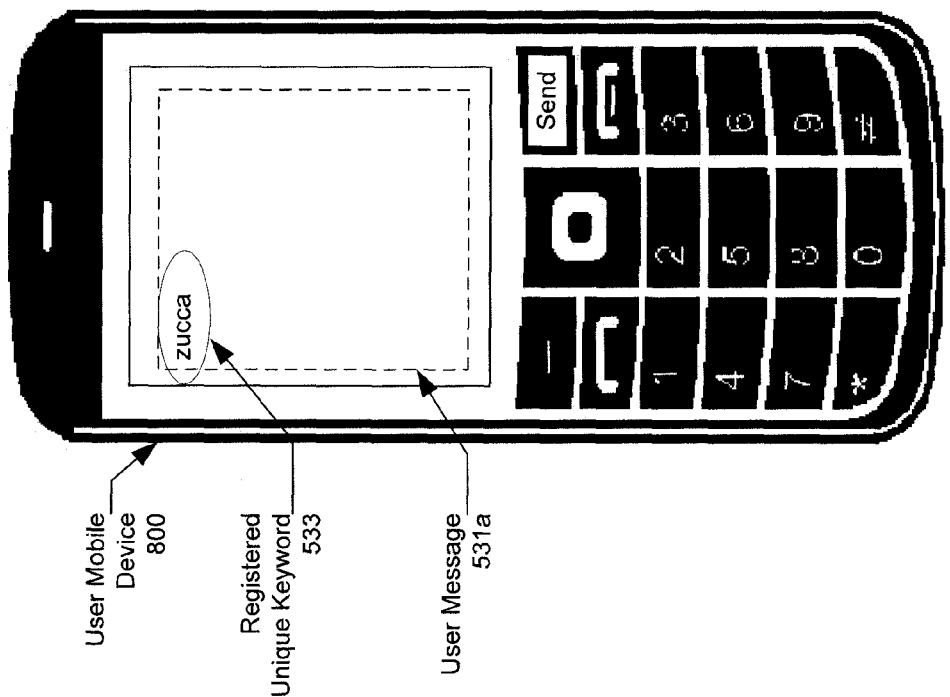

FIG. 9B shows the user mobile device (800) displaying an example user message (531) containing the registered unique keyword (533) (i.e, zucca). Alternatively, the registered unique keyword (533) may be obtained by the user from an advertisement distributed, for example, by restaurant zucca in a commercial promotion.

As shown, the registered unique keyword (533) (i.e, zucca), is associated with the Zucca Textsite (149b), which is stored in the global textsite platform (518d). As shown, the Zucca Textsite (149b) includes the navigating keywords "Locations" and "Pita Wraps." Further, the global textsite platform (518d) further includes a User-Navigation Map (506a). According to one or more embodiments of the invention, the User-Navigation map (506a) is specific to the user mobile device (800). As shown, the user mobile device (800) has not yet sent the user message including the registered unique keyword (533). Accordingly, no data regarding the Zucca textsite (149b) is currently stored in the User-Navigation Map (506a). However, as shown, the User-Navigation Map (506a) indicates that the user mobile device (800) has previously visited other text pages. As shown, the user mobile device (800) has visited a weather text page, and two text pages have been associated with navigation state identifiers A and B. Although the User-Navigation Map depicts a relationship between a navigation state identifier, a navigating keyword (i.e, weather, location), and a URL, it is important to note that all that needs to be stored in the User-Navigation Map is an association between a navigation state identifier and a text page such that the text page may be accessed at a later time.

Figure 9C:
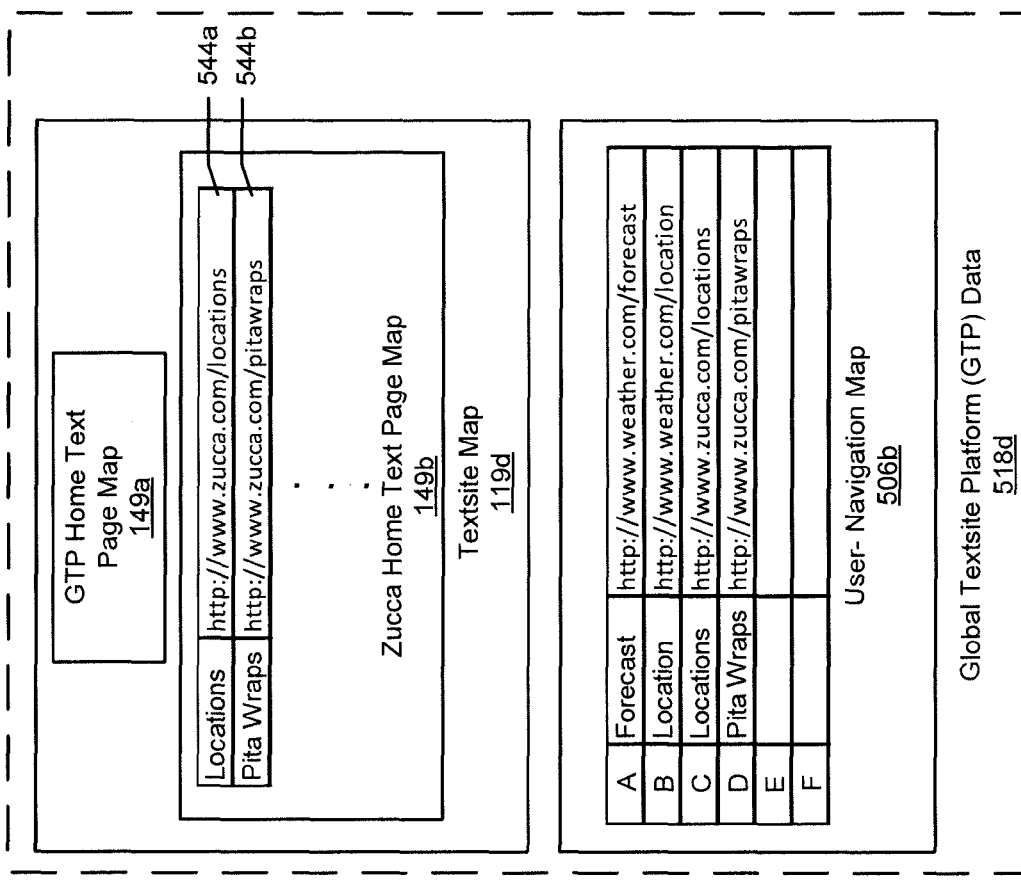
Figure 9C:
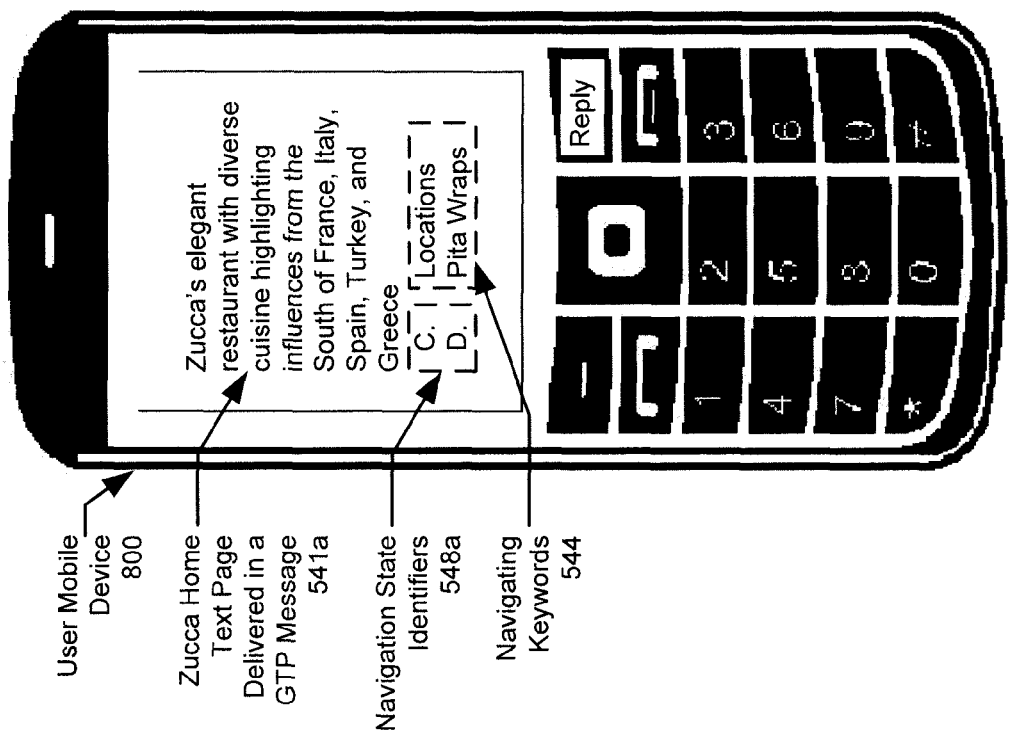

FIG. 9C shows the user mobile device (800) displaying an example home text page of the textsite for restaurant Zucca, which is delivered in a GTP message (541) in response to the user message (531) described above. As shown, the example Zucca home text page includes navigating keywords and representations thereof (544) listed as "Locations" and "Pita Wrap". Further, the navigating keywords have been modified by the navigation state identifiers (548a). For example, "C" is the navigation state identifier for the navigating keyword "Locations." The aforementioned navigating keywords and navigation state identifiers are displayed together for user selection in the Zucca home text page.

In the example shown in FIG. 9C, the GTP data (518d) is essentially the same as the GTP data (518b) shown in FIG. 9A above with an additional zucca home text page map (149b) included in the textsite map (119d). As described above, the zucca home text page map (149a) contains entries for describing representations of the navigating keywords within the zucca home text page and for describing access information for respective text pages referenced by the navigating keywords. Further, the User-Navigation Map (506b) includes navigation state identifiers corresponding to each navigating keyword. For example, including either the navigating keyword or the navigation state identifier in response to GTP message (541a) (i.e, either one of "Locations" or "C") in a user message results in a text page containing address and driving direction information of the Zucca restaurant being identified by the GTP. Further, the user may later send a user message including the navigation state identifier "C" and navigate to the Locations text page of the Zucca textsite, even after navigating to a different textsite using navigation state identifiers sequentially after the "C" of the Zucca restaurant location text page.

Figure 9D:
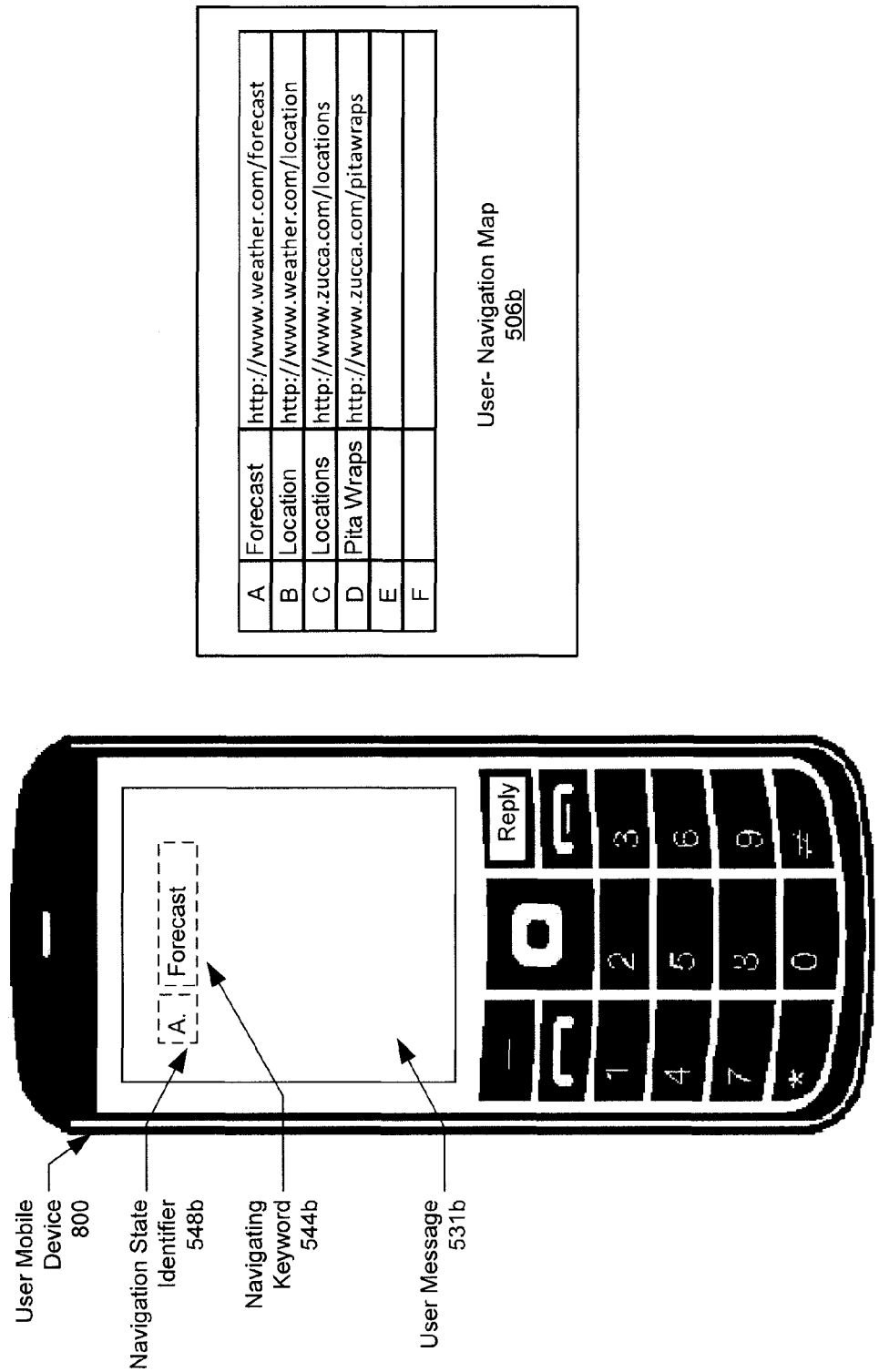

FIG. 9D shows the user mobile device (800) displaying an example user message (531b) containing a navigation state identifier (548b) (i.e., "A"), and a navigating keyword (544b) (i.e, Forecast). Those skilled the art will appreciate that as long as the first character or sequence of characters is a navigation state identifier, the user does not have to include the navigating keyword in the message. However, a user may choose to include the navigating keyword, for example, to maintain a user experience of browsing textsites.

As shown, the navigation state identifier (548b) (i.e., "A"), is associated with the Forecast page of the Weather textsite. This association is stored in the User-Navigation Map (506b). As shown, the user is sending this user message after visiting other textsites (i.e, the Zucca textsite). The User-Navigation Map (506b) shows that the navigation state identifier "A" is linked to a text page for the forecast which is stored in the global textsite platform (518d).

Figure 9E:
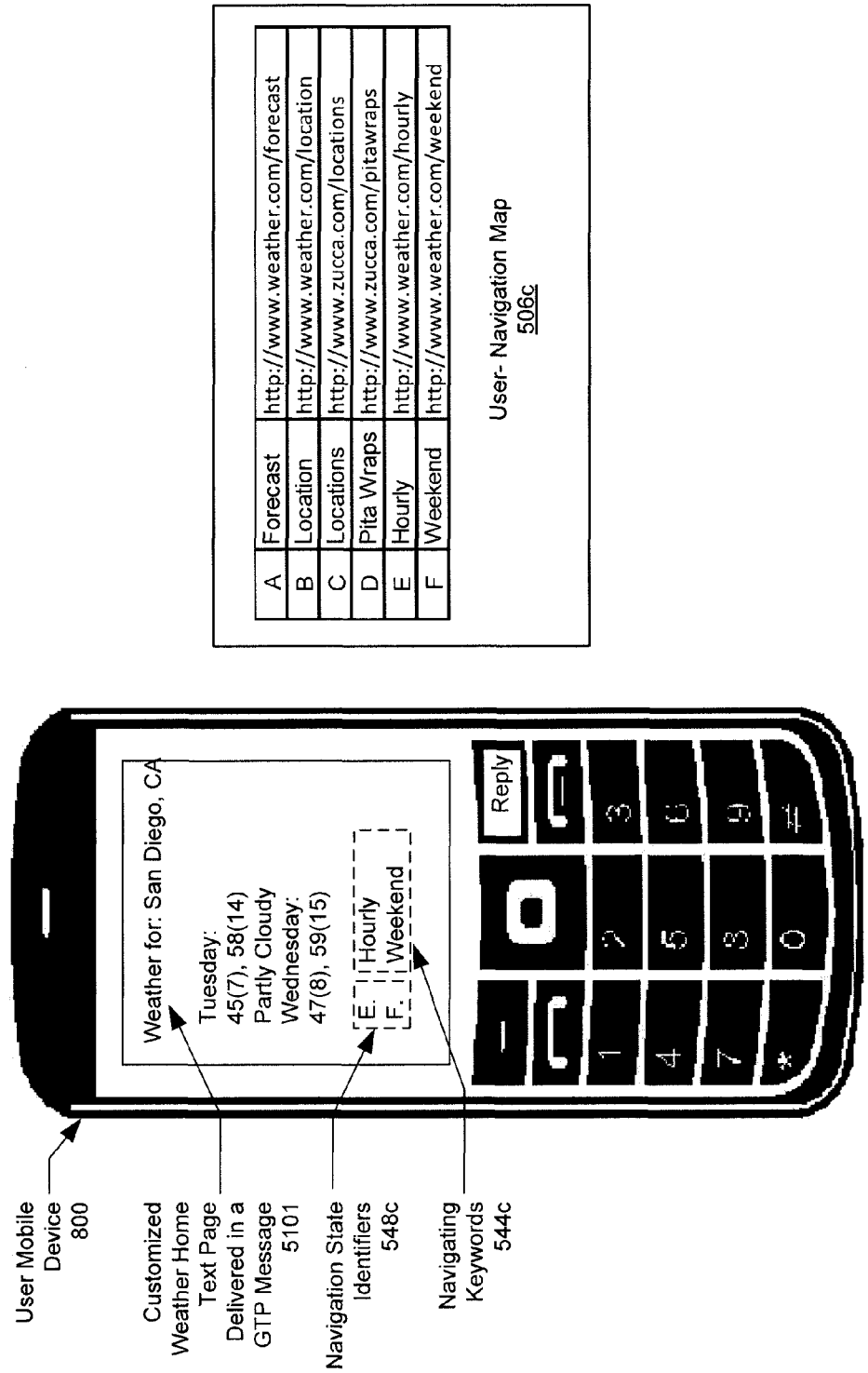

FIG. 9E shows the user mobile device (800) displaying the forecast text page of the weather textsite (5101) as identified in FIG. 9D. As shown, forecast text page includes navigating keywords (544c) (i.e, Hourly, Weekend). Further, each of these navigating keywords have been modified by navigation state identifiers (548c). As described above, each navigating keyword is associated with a navigation state identifier beginning with the next available navigation state identifier, according to one or more embodiments of the invention. As shown in FIG. 9D, navigation state identifier "E" was the next available navigation state identifier. Accordingly, in FIG. 9E, the User-Navigation Map (508c) now includes the Hourly and Weekend navigating keywords and associated text pages as being assigned to navigation state identifiers "E" and "F."

Figure 9F:
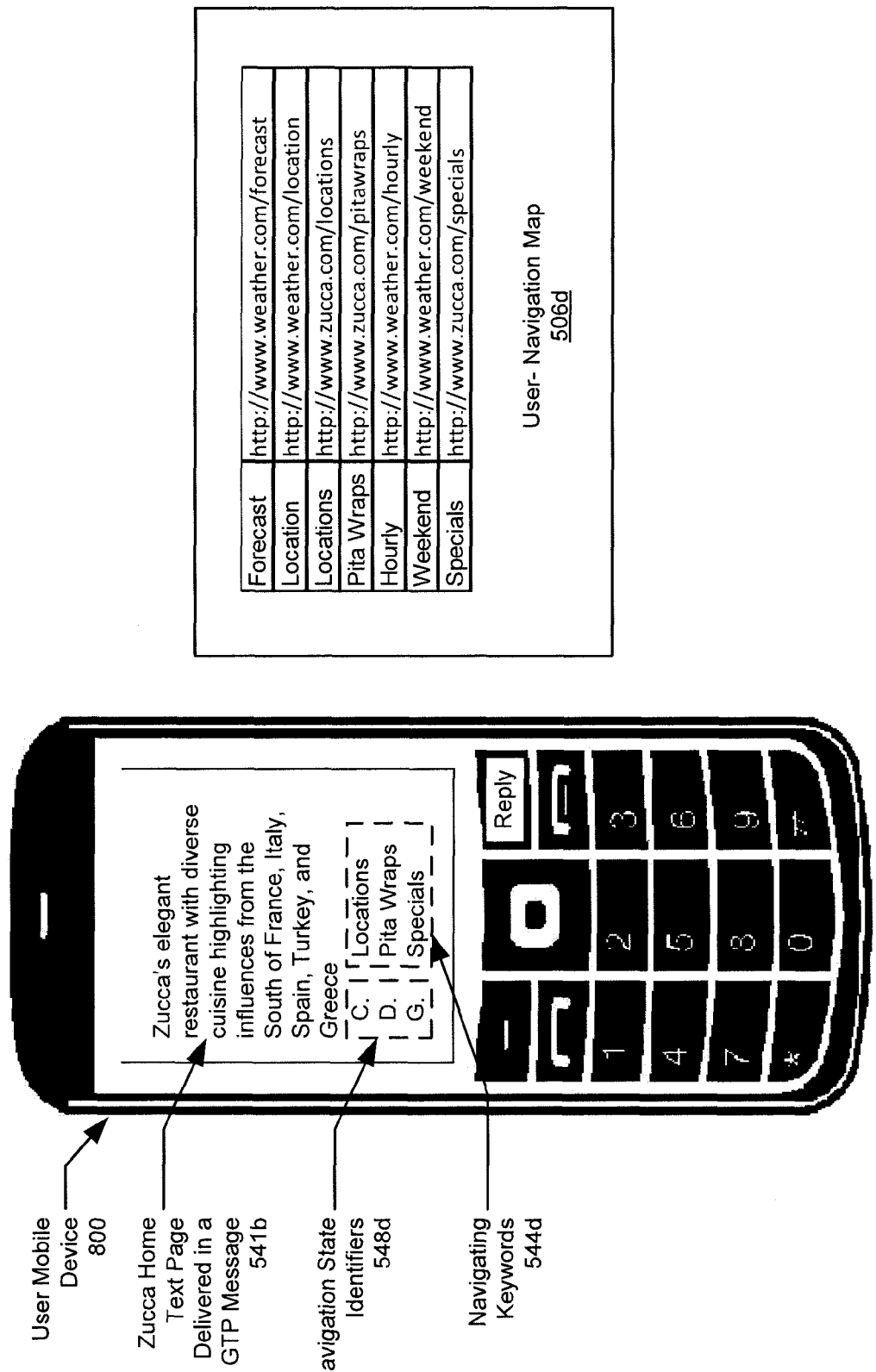

FIG. 9F shows an example of the user mobile device (800) having navigated to the Zucca home text page (541b) after visiting the forecast text page as shown in FIG. 9E. As shown the example Zucca home text page still includes navigating keywords "Locations" and "Pita Wrap" (548d). However, now the Zucca home text page also includes a third navigating keyword (i.e, Specials) (544d). According to one or more embodiments, this may occur when the publisher/developer has modified the textsite since the last time the user viewed it. Accordingly, in generating the GTP message (541b), the navigating keyword "Specials" was modified by the next available navigation state identifier (i.e, "G"), whereas, since Locations and Pita Wraps were already associated with navigation state identifiers in the User-Navigation Map (506d), they retain their previously assigned navigation state identifiers.

Although the GTP data are in specific formats and organizations in the examples described in reference to FIGS. 9A-9F above, those skilled in the art with the benefit of this disclosure will recognize that GTP data may be in other formats or organizations without deviating from the spirit of the invention.

Embodiments of the invention provide a globally accessible platform that provides access to content via a TMS to mobile device users that may not subscribe to a data plan for obtaining information via web browsing or by connecting to the Internet. Specifically, embodiments of the invention provide global textsite platform for creating, maintaining, and providing access to textsites created by the global textsite platform or by publishers/developers/service providers of content. The global textsite platform is globally accessible by publishers/developers/service providers authoring content, and by users browsing the content on textsites, in any geographic location. In addition, embodiments of the invention provide a mechanism for the GTP to remember a finite number of states for each textsite that is visited by a user by associating/mapping each text page accessed by a navigating keyword with a sequential navigation state identifier. This enables a user to return to previously visited textsites and "pick-up" the browsing experience from the most recently viewed text page of the chosen textsite, without having to restart navigation from the textsite's home page.

The invention may be implemented on virtually any type of computer regardless of the platform being used. For example, as shown in FIG. 10, a networked computer system (900) includes a processor (902) such as an integrated circuit, a central processing unit (CPU), or other hardware processor, associated memory (904), a storage device (906), and numerous other elements and functionalities typical of today's computers (not shown). The networked computer (900) may also include input means, such as a keyboard (908) and a mouse (910), and output means, such as a monitor (912). The networked computer system (900) is connected to a local area network (LAN) or a wide area network (e.g., the Internet) (not shown) via a network interface connection (not shown). Those skilled in the art will appreciate that these input and output means may take other forms, now known or later developed. Further, those skilled in the art will appreciate that one or more elements of the aforementioned computer (900) may be located at a remote location and connected to the other elements over a network.

Further, the invention may be implemented on a distributed system having a plurality of nodes, where each portion of the invention may be located on a different node within the distributed system. In one or more embodiments of the invention, the node corresponds to a computer system. Alternatively, the node may correspond to a processor with associated physical memory.

In one or more embodiments of the invention, software instructions to perform embodiments of the invention, when executed by a processor, may be stored on a non-transitory computer readable storage medium such as a compact disc (CD), a diskette, a tape, or any other tangible computer readable storage device. Further, one or more embodiments of the invention may be implemented as an Application Program Interface (API) executing on a computer system(s), where the API includes one or more software instructions.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for providing access to content using a global textsite platform (GTP) comprising:

receiving, from a user device, a first user message comprising a first navigation state identifier of a sequential plurality of navigation state identifiers, wherein the user device is associated with a device identifier;

identifying, in a data structure, a first text page of the first textsite associated with the first navigation state identifier, wherein the data structure is associated with the device identifier;

identifying a second text page of the first textsite associated with a first navigating keyword, wherein the second text page is navigable from the first text page;

determining a second navigation state identifier, wherein the second navigation state identifier is sequentially after the first navigation state identifier;

associating the second text page with the second navigation state identifier;

storing the association between the second text page and the second navigation state identifier in the data structure;

generating a first GTP message of the first text page, wherein the first text page comprises the first navigating keyword modified by the second navigation state identifier; and sending the first GTP message for display on the user device.

2. The method of claim 1, further comprising, upon storing the association between the second text page and the second navigation state identifier in the data structure:

receiving, from the user device, a second user message comprising a third navigation state identifier of the sequential plurality of navigation state identifiers, wherein the third navigation state identifier is sequentially before the first navigation state identifier;

identifying, in the data structure, a third text page of a previously navigated textsite associated with the third navigation state identifier;

identifying a third navigating keyword in the third text page, wherein the third navigating keyword is associated with a fourth text page of the previously navigated textsite;

determining a fourth navigation state identifier of the sequential plurality of navigation state identifiers, wherein the fourth navigation state identifier is sequentially after the second navigation state identifier;

associating the fourth text page and the fourth navigation state identifier;

storing the association between the fourth text page and the fourth navigation state identifier in the data structure;

generating a second GTP message comprising the third text page of the previously navigated textsite, wherein the third text page comprises the third navigating keyword modified by the fourth navigation state identifier; and sending the second GTP message for display to the user device.

3. The method of claim 2, further comprising, upon sending the second GTP message to the user device:

receiving, from the user device, a third user message comprising the first navigation state identifier;

identifying, in the data structure, that the first navigation state identifier is associated with the first text page of the first textsite;

identifying the first navigating keyword and a fourth navigating keyword in the first text page, wherein the fourth navigating keyword was not previously in the first text page, wherein the fourth navigating keyword is associated with a third text page of the first textsite;

determining a fifth navigation state identifier, wherein the fifth navigation state identifier is sequentially after the fourth navigation state identifier;

associating the third text page and the fifth navigation state identifier;

storing the association between the third text page and the fifth navigation state identifier in the data structure;

generating a third GTP message of the first text page, wherein the third text page comprises the first navigating keyword modified by the second navigation state identifier, and the fourth navigating keyword modified by the fifth navigation state identifier; and sending the third GTP message for display to the user device.

4. The method of claim 1, wherein the first textsite is hosted on a server of the GTP.

5. The method of claim 1, wherein the first textsite is hosted on a third party server separate from the GTP.

6. The method of claim 1, further comprising, prior to receiving the first user message:

receiving, from the user device, a prior user message identifying a registered unique keyword maintained by the GTP, wherein the registered unique keyword is associated with the first textsite;

identifying a third navigating keyword in the first textsite, wherein the third navigating keyword is associated with the first text page of the first textsite;

identifying the first navigation state identifier of the sequential plurality of navigation state identifiers;

associating the first text page of the first textsite and the first navigation state identifier; and storing the association between the first text page of the first textsite and the first navigation state identifier in the data structure.

7. The method of claim 1, wherein the first user message is received using one selected from a group consisting of a short message service protocol and a text message.

8. The method of claim 1, wherein the sequential plurality of navigation state identifiers comprises a predetermined number of states, and wherein the predetermined number of states are re-used from the beginning of the sequential plurality of navigation state identifiers when each of the predetermined number of states have been used in associated with a navigating keyword.

9. A non-transitory computer readable storage medium comprising computer readable code that, when executed by a processor, is configured to perform a method for providing access to content using a global textsite platform (GTP), the method comprising:

receiving, from a user device, a first user message comprising a first navigation state identifier of a sequential plurality of navigation state identifiers, wherein the user device is associated with a device identifier;

identifying, in a data structure, a first text page of the first textsite associated with the first navigation state identifier, wherein the data structure is associated with the device identifier;

identifying a second text page of the first textsite associated with a first navigating keyword, wherein the second text page is navigable from the first text page;

determining a second navigation state identifier, wherein the second navigation state identifier is sequentially after the first navigation state identifier;

associating the second text page with the second navigation state identifier;

storing the association between the second text page and the second navigation state identifier in the data structure;

generating a first GTP message of the first text page, wherein the first text page comprises the first navigating keyword modified by the second navigation state identifier; and sending the first GTP message for display on the user device.

10. The non-transitory computer readable storage medium of claim 9, the method further comprising, upon storing the association between the second text page and the second navigation state identifier in the data structure:

receiving, from the user device, a second user message comprising a third navigation state identifier of the sequential plurality of navigation state identifiers, wherein the third navigation state identifier is sequentially before the first navigation state identifier;

identifying, in the data structure, a third text page of a previously navigated textsite associated with the third navigation state identifier;

identifying a third navigating keyword in the third text page, wherein the third navigating keyword is associated with a fourth text page of the previously navigated textsite;

determining a fourth navigation state identifier of the sequential plurality of navigation state identifiers, wherein the fourth navigation state identifier is sequentially after the second navigation state identifier;

associating the fourth text page and the fourth navigation state identifier;

storing the association between the fourth text page and the fourth navigation state identifier in the data structure;

generating a second GTP message comprising the third text page of the previously navigated textsite, wherein the third text page comprises the third navigating keyword modified by the fourth navigation state identifier; and sending the second GTP message for display to the user device.

11. The non-transitory computer readable storage medium of claim 10, the method further comprising, upon sending the second GTP message to the user device:

receiving, from the user device, a third user message comprising the first navigation state identifier;

identifying, in the data structure, that the first navigation state identifier is associated with the first text page of the first textsite;

identifying the first navigating keyword and a fourth navigating keyword in the first text page, wherein the fourth navigating keyword was not previously in the first text page, wherein the fourth navigating keyword is associated with a third text page of the first textsite;

determining a fifth navigation state identifier, wherein the fifth navigation state identifier is sequentially after the fourth navigation state identifier;

associating the third text page and the fifth navigation state identifier;

storing the association between the third text page and the fifth navigation state identifier in the data structure;

generating a third GTP message of the first text page, wherein the third text page comprises the first navigating keyword modified by the second navigation state identifier, and the fourth navigating keyword modified by the fifth navigation state identifier; and sending the third GTP message for display to the user device.

12. The non-transitory computer readable storage medium of claim 9, wherein the first textsite is hosted on a server of the GTP.

13. The non-transitory computer readable storage medium of claim 9, wherein the first textsite is hosted on a third party server separate from the GTP.

14. The non-transitory computer readable storage medium of claim 9, the method further comprising, prior to receiving the first user message:
   receiving, from the user device, a prior user message identifying a registered unique keyword maintained by the GTP, wherein the registered unique keyword is associated with the first textsite;
   identifying a third navigating keyword in the first textsite, wherein the third navigating keyword is associated with the first text page of the first textsite;
   identifying the first navigation state identifier of the sequential plurality of navigation state identifiers;
   associating the first text page of the first textsite and the first navigation state identifier; and
   storing the association between the first text page of the first textsite and the first navigation state identifier in the data structure.

15. The non-transitory computer readable storage medium of claim 9, wherein the first user message is received using one selected from a group consisting of a short message service protocol and a text message.

16. The non-transitory computer readable storage medium of claim 9, wherein the sequential plurality of navigation state identifiers comprises a predetermined number of states, and wherein the predetermined number of states are re-used from the beginning of the sequential plurality of navigation state identifiers when each of the predetermined number of states have been used in associated with a navigating keyword.

17. A system for providing access to content using a global textsite platform (GTP) comprising:
   a data repository comprising a data structure, wherein the data structure comprises a sequential plurality of navigation state identifiers, and wherein the data structure is associated with a device identifier;
   a processor; and
   a memory storing instructions which, when executed by the processor, are configured to:
      receive, from a user device, a first user message comprising a first navigation state identifier of a sequential plurality of navigation state identifiers, wherein the user device is associated with the device identifier,
      identify, in the data structure, a first text page of the first textsite associated with the first navigation state identifier,
      identify a second text page of the first textsite associated with the first navigating keyword, wherein the second text page is navigable from the first text page,
      determine a second navigation state identifier, wherein the second navigation state identifier is sequentially after the first navigation state identifier,
      associate the second text page with the second navigation state identifier,
      store the association between the second text page and the second navigation state identifier in the data structure,
      generate a first GTP message of the first text page, wherein the first text page comprises the first navigating keyword modified by the second navigation state identifier, and
      send the first GTP message for display to the user device.

18. The system of claim 17, wherein the instructions are further configured to, upon storing the association between the second text page and the second navigation state identifier in the data structure:
   receive, from the user device, a second user message comprising a third navigation state identifier of the sequential plurality of navigation state identifiers, wherein the third navigation state identifier is sequentially before the first navigation state identifier,
   identify, in the data structure, a third text page of a previously navigated textsite associated with the third navigation state identifier,
   identify a third navigating keyword in the third text page, wherein the third navigating keyword is associated with a fourth text page of the previously navigated textsite,
   determine a fourth navigation state identifier of the sequential plurality of navigation state identifiers, wherein the fourth navigation state identifier is sequentially after the second navigation state identifier,
   associate the fourth text page and the fourth navigation state identifier,
   store the association between the fourth text page and the fourth navigation state identifier in the data structure,
   generate a second GTP message comprising the third text page of the previously navigated textsite, wherein the third text page comprises the third navigating keyword modified by the fourth navigation state identifier, and
   send the second GTP message for output to the user device.

19. The system of claim 18, wherein the instructions are further configured to, upon sending the second GTP message to the user device:
   receive, from the user device, a third user message comprising the first navigation state identifier,
   identify, in the data structure, that the first navigation state identifier is associated with the first text page of the first textsite,
   identify the first navigating keyword and a fourth navigating keyword in the first text page, wherein the fourth navigating keyword was not previously in the first text page, wherein the fourth navigating keyword is associated with a third text page of the first textsite,
   determine a fifth navigation state identifier, wherein the fifth navigation state identifier is sequentially after the fourth navigation state identifier,
   associate the third text page and the fifth navigation state identifier,
   store the association between the third text page and the fifth navigation state identifier in the data structure,
   generate a third GTP message of the first text page, wherein the third text page comprises the first navigating keyword modified by the second navigation state identifier, and the fourth navigating keyword modified by the fifth navigation state identifier, and
   send the third GTP message for display to the user device.

20. The system of claim 17, wherein the first textsite is hosted on a server of the GTP.

21. The system of claim 17, wherein the first textsite is hosted on a third party server separate from the GTP.

22. The system of claim 17, wherein the instructions are further configured to, prior to receiving the first user message:
   receive, from the user device, a prior user message identifying a registered unique keyword maintained by the GTP, wherein the registered unique keyword is associated with the first textsite,
   identify a third navigating keyword in the first textsite, wherein the third navigating keyword is associated with the first text page of the first textsite,
   identify the first navigation state identifier of the sequential plurality of navigation state identifiers,
   associate the first text page of the first textsite and the first navigation state identifier, and store the association between the first text page of the first textsite and the first navigation state identifier in the data structure.

23. The system of claim 17, wherein the first user message is received using one selected from a group consisting of a short message service protocol and a text message.

24. The system of claim 17, wherein the sequential plurality of navigation state identifiers comprises a predetermined number of states, and wherein the predetermined number of states are re-used from the beginning of the sequential plurality of navigation state identifiers when each of the predetermined number of states have been used in associated with a navigating keyword.

25. A method for providing access to content using a global textsite platform (GTP) comprising:
sending, from a user device associated with a device identifier, a first user message comprising a registered unique keyword maintained by the GTP for a first textsite,
wherein the first textsite comprises a home text page for the first textsite, a first text page, and a second text page, wherein the first text page is indexed by a first navigating keyword, and the second text page is indexed by a second navigating keyword, and
wherein the first text page is navigable from the home text page, and the second text page is navigable from the first text page;
receiving, in response to the first user message, a first GTP message comprising the home text page for the first textsite, comprising the first navigating keyword modified by a first navigation state identifier of a sequential plurality of navigation state identifiers,
sending, from the user device, a second user message comprising the first navigation state identifier;
receiving, in response to the second user message, a second GTP message comprising the first text page comprising the second navigating keyword modified by a second navigation state identifier that is sequentially after the first navigation state identifier,
sending, in response to the second GTP message, a third user message comprising a third navigation state identifier that is sequentially before the first navigation state identifier;
receiving, from the GTP, a third GTP message of a third text page of a previously visited textsite corresponding to the third navigation state identifier.

26. The method of claim 25, wherein the third text page comprises a fourth navigating keyword corresponding to a fourth text page of the prior visited textsite,
wherein the fourth navigation state identifier is sequentially after the third navigation state identifier in the sequential plurality of navigation state identifiers, and
wherein the third GTP message comprises the third text page comprising the fourth navigating keyword modified by the fourth navigation state identifier.

27. A non-transitory computer readable storage medium comprising computer readable code that, when executed by a processor, is configured to perform a method comprising:
sending, from a user device associated with a device identifier, a first user message comprising a registered unique keyword maintained by a global textsite platform (GTP) for a first textsite,
wherein the first textsite comprises a home text page for the first textsite, a first text page, and a second text page, wherein the first text page is indexed by a first navigating keyword, and the second text page is indexed by a second navigating keyword, and
wherein the first text page is navigable from the home text page, and the second text page is navigable from the first text page;
receiving, in response to the first user message, a first GTP message comprising the home text page for the first textsite, comprising the first navigating keyword modified by a first navigation state identifier of a sequential plurality of navigation state identifiers;
sending, from the user device, a second user message comprising the first navigation state identifier;
receiving, in response to the second user message, a second GTP message comprising the first text page comprising the second navigating keyword modified by a second navigation state identifier that is sequentially after the first navigation state identifier;
sending, in response to the second GTP message, a third user message comprising a third navigation state identifier that is sequentially before the first navigation state identifier;
receiving, from the GTP, a third GTP message of a third text page of a previously visited textsite corresponding to the third navigation state identifier.

28. The non-transitory computer readable storage medium of claim 27, wherein the third text page comprises a fourth navigating keyword corresponding to a fourth text page of the prior visited textsite,
wherein the fourth navigation state identifier is sequentially after the third navigation state identifier in the sequential plurality of navigation state identifiers, and
wherein the third GTP message comprises the third text page comprising the fourth navigating keyword modified by the fourth navigation state identifier.

* * * * *

UNITED STATES PATENT AND TRADEMARK OFFICE
CERTIFICATE OF CORRECTION

| | |
|---|---|
| PATENT NO. | : 8,566,408 B2 |
| APPLICATION NO. | : 12/904966 |
| DATED | : October 22, 2013 |
| INVENTOR(S) | : Manish R. Shah et al. |

It is certified that error appears in the above-identified patent and that said Letters Patent is hereby corrected as shown below:

In the Claims:

At column 25, claim number 3, line number 6, the words "wherein the third text page" should read -- wherein the first text page --.

Signed and Sealed this
Fifth Day of January, 2016

Michelle K. Lee
*Director of the United States Patent and Trademark Office*